United States Patent
Wu et al.

(10) Patent No.: US 11,678,303 B2
(45) Date of Patent: Jun. 13, 2023

(54) METHOD AND DEVICE IN NODE FOR SIDELINK TRANSMISSION IN WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 117 days.

(21) Appl. No.: 16/905,925

(22) Filed: Jun. 19, 2020

(65) Prior Publication Data

US 2020/0404626 A1    Dec. 24, 2020

(30) Foreign Application Priority Data

Jun. 24, 2019    (CN) .......................... 201910551650.8

(51) Int. Cl.
*H04W 72/04*    (2009.01)
*H04W 74/08*    (2009.01)

(52) U.S. Cl.
CPC ....... *H04W 72/04* (2013.01); *H04W 74/0808* (2013.01)

(58) Field of Classification Search
CPC . H04W 72/04; H04W 74/0808; H04W 72/02; H04W 4/005; H04W 4/70; H04W 56/002; H04W 8/005; H04W 88/02; H04W 88/08; H04L 67/12
See application file for complete search history.

(56) References Cited

U.S. PATENT DOCUMENTS

| | | | |
|---|---|---|---|
| 11,356,991 B2* | 6/2022 | Matsuda | ........... H04W 72/0406 |
| 2016/0088613 A1 | 3/2016 | Li et al. | |
| 2017/0026297 A1* | 1/2017 | Sun | .......................... H04L 47/25 |
| 2017/0150480 A1* | 5/2017 | Kim | ...................... H04W 8/005 |
| 2021/0243726 A1* | 8/2021 | Osawa | .............. H04W 72/0406 |

FOREIGN PATENT DOCUMENTS

CN    109076397 A    12/2018

OTHER PUBLICATIONS

Office Action received in Chinese patent application No. 201910551650.8, dated Jun. 6, 2022.
Search Report received in Chinese patent application No. 201910551650.8, dated Jun. 14, 2022.

* cited by examiner

*Primary Examiner* — Rushil Parimal Sampat

(57) ABSTRACT

The present disclosure provides a method and a device in a node used for wireless communications. A first node receives first information and second information, the second information being used to determine a first time-frequency resource group; then judges whether to perform a first channel sensing; when the result of the judging action is no, transmits a first radio signal in the first time-frequency resource group; when the result of the judging action is yes, performs the first channel sensing to determine whether a first radio signal is transmitted in the first time-frequency resource group; when the result of the determining action is yes, transmits the first radio signal in the first time-frequency resource group; when the result of the determining action is no, drops the transmission of the first radio signal in the first time-frequency resource group.

18 Claims, 12 Drawing Sheets

METHOD AND DEVICE IN NODE FOR SIDELINK TRANSMISSION IN WIRELESS COMMUNICATION

CROSS REFERENCE TO RELATED APPLICATIONS

This application claims the priority benefit of Chinese Patent Application No. 201910551650.8, filed on Jun. 24, 2019, the full disclosure of which is incorporated herein by reference.

BACKGROUND

Technical Field

The present disclosure relates to a transmission method and device in a wireless communication system, and in particular to a transmission scheme and device of a sidelink in wireless communications.

Related Art

Application scenarios of future wireless communication systems are becoming increasingly diversified, and different application scenarios have different performance demands on systems. In order to meet different performance requirements of various application scenarios, it was decided at the 3rd Generation Partner Project (3GPP) Radio Access Network (RAN #72 plenary session that a study on New Radio (NR), or what is called Fifth Generation (5G) shall be conducted. The work item of NR was approved at the 3GPP RAN #75 plenary session to standardize NR.

In response to rapidly growing Vehicle-to-Everything (V2X) business, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was approved.

SUMMARY

Compared with the existing Long-term Evolution (LTE) V2X system, NR V2X has a notable feature in supporting groupcast and unicast as well as Hybrid Automatic Repeat Request (HARQ) feedback and Channel Status Information (CSI) feedback. The design of HARQ feedback and CSI feedback requires solutions.

In view of the above problem, the present disclosure provides a solution. It should be noted that the embodiments of a User Equipment (UE) in the present disclosure and the characteristics of the embodiments may be applied to a base station if no conflict is incurred, and vice versa. The embodiments of the present disclosure and the characteristics of the embodiments may be mutually combined if no conflict is incurred.

The present disclosure provides a method in a first node for wireless communication, comprising:

receiving first information and second information, the second information being used to determine a first time-frequency resource group; and judging whether a first channel sensing is performed;

when the result of the judging action is no, transmitting a first radio signal in the first time-frequency resource group, and when the result of the judging action is yes, performing the first channel sensing to determine whether a first radio signal is transmitted in the first time-frequency resource group; when the result of the determining action is yes, transmitting the first radio signal in the first time-frequency resource group, and when the result of the determining action is no, dropping the transmission of the first radio signal in the first time-frequency resource group;

wherein the first information is used to determine whether the first node and a transmitter of the second information belong to a same serving cell, and the first information is used to judge whether the first channel sensing is performed.

In one embodiment, a problem needed to be solved in the present disclosure is that when a UE requests to transmit a radio signal to a UE outside the serving cell, how the UE outside the serving cell responds is a key problem to be solved.

In one embodiment, the essence of the above method is that when UE 1 requests UE 2 to transmit a radio signal (i.e., a first radio signal, e.g., HARQ feedback and CSI feedback) in a first time-frequency resource group, the UE 2 determines whether to perform channel sensing according to whether it belongs to the same serving cell as the UE 1; when the UE 2 determines not to perform channel sensing, the UE 2 transmits the radio signal in a first time-frequency resource group; otherwise, the UE 2 estimates the signal strength in a first time-frequency resource group through channel sensing, and determines whether to transmit the radio signal according to channel strength. The advantage of adopting the above method is that it can reduce the probability of traffic collision through channel sensing when necessary, thus improving the transmission reliability.

According to one aspect of the present disclosure, the method is characterized in that when the first node and a transmitter of the second information belong to a same serving cell, the first channel sensing is determined not to be performed; when the first node and a transmitter of the second information do not belong to a same serving cell, the first channel sensing is determined to be performed.

In one embodiment, the essence of the above method is that when the UE 2 and the UE 1 belong to a same serving cell, the UE 2 transmits requested radio signals in a first time-frequency resource group; otherwise, the UE 2 performs a channel sensing to determine whether to transmit requested radio signals. The advantage of the above method is that when the UE 2 is outside the serving cell of the UE 1, whether the UE 2 responds to the request of the UE 1 takes into account the interference to nodes (e.g., UE, relay and base station) around the UE 2, thus reducing the probability of traffic conflict and improving the transmission reliability.

According to one aspect of the present disclosure, the above method is characterized in comprising:

receiving a first signaling group, the first signaling group being used to indicate a first time-frequency resource pool;

wherein only when the first time-frequency resource group overlaps with the first time-frequency resource pool, the action of judging whether to perform the first channel sensing is performed.

According to one aspect of the present disclosure, the above method is characterized in comprising:

transmitting a second signaling group, the second signaling group being used to indicate a second time-frequency resource pool;

wherein only when the first time-frequency resource group overlaps with the second time-frequency resource pool, the action of judging whether to perform the first channel sensing is performed.

According to one aspect of the present disclosure, the above method is characterized in comprising:

receiving a second radio signal;

wherein the second information is used to indicate the time-frequency resources occupied by the second radio signal, which the first radio signal is related to.

According to one aspect of the present disclosure, the method is characterized in that the first channel sensing is performed in a reference time-frequency resource group, frequency-domain resources occupied by the reference time-frequency resource group are related to frequency-domain resources occupied by the first time-frequency resource group, the first channel sensing is used to obtain a first measurement value, and the size relationship between the first measurement value and a target threshold is used to determine whether to transmit the first radio signal in the first time-frequency resource group.

According to one aspect of the present disclosure, the above method is characterized in comprising:

receiving third information;

wherein the third information is used to indicate the target threshold.

The present disclosure provides a method in a second node for wireless communication, comprising:

transmitting first information and second information, the second information is used to determine a first time-frequency resource group;

monitoring a first radio signal in the first time-frequency resource group;

wherein the first information is used to determine whether the second node and a target receiver of the second information belong to a same serving cell; the first information is used to judge whether the target receiver of the second information performs a first channel sensing; when the result of the judging action is no, the first radio signal is transmitted in the first time-frequency resource group; when the result of the judging action is yes, the first channel sensing is used to determine whether the first radio signal is transmitted in the first time-frequency resource group.

According to one aspect of the present disclosure, the method is characterized in that when the second node and the target receiver of the second information belong to a same serving cell, the target receiver of the second information determines not to perform the first channel sensing; when the second node and the target receiver of the second information do not belong to a same serving cell, the target receiver of the second information determines to perform the first channel sensing.

According to one aspect of the present disclosure, the above method is characterized in comprising:

receiving a second signaling group, the second signaling group being used to indicate a second time-frequency resource pool;

wherein only when the first time-frequency resource group overlaps with the second time-frequency resource pool, the monitoring of the first radio signal in the first time-frequency resource group is performed.

According to one aspect of the present disclosure, the above method is characterized in comprising:

transmitting a second radio signal;

wherein the second information is used to indicate time-frequency resources occupied by the second radio signal, which the first radio signal is related to.

The present disclosure provides a first node for wireless communication, comprising:

a first receiver, receiving first information and second information, the second information is used to determine a first time-frequency resource group;

a first transceiver, judging whether to perform a first channel sensing; when the result of the judging action is no, transmitting a first radio signal in the first time-frequency resource group; when the result of the judging action is yes, performing the first channel sensing to determine whether to transmit a first radio signal in the first time-frequency resource group; when the result of the determining action is yes, transmitting the first radio signal in the first time-frequency resource group; and when the result of the determining action is no, dropping the transmission of the first radio signal in the first time-frequency resource group.

The present disclosure provides a second node for wireless communication, comprising:

a second transmitter, transmitting first information and second information, the second information being used to determine a first time-frequency resource group;

a second receiver, monitoring a first radio signal in the first time-frequency resource group;

wherein the first information is used to determine whether the second node and a target receiver of the second information belong to a same serving cell; the first information is used to judge whether the target receiver of the second information performs a first channel sensing; when the result of the judging action is no, the first radio signal is transmitted in the first time-frequency resource group; when the result of the judging action is yes, the first channel sensing is used to determine whether the first radio signal is transmitted in the first time-frequency resource group.

In one embodiment, the method in the present disclosure is advantageous in the following aspects:

the present disclosure proposes a method of how the requested UE responds when one UE requests another UE to transmit a radio signal.

In the method mentioned in the present disclosure, when UE 1 requests UE 2 to transmit a radio signal (i.e., a first radio signal, such as HARQ feedback and CSI feedback) in a first time-frequency resource group, the UE 2 determines whether to perform channel sensing to determine whether to transmit a radio signal in a requested first time-frequency resource group according to whether it belongs to a same serving cell as the UE 1, where channel sensing can reduce the probability of traffic conflicts, thus improving transmission reliability.

As described in the method mentioned in the present disclosure, when UE 2 and UE 1 belong to a same serving cell, the UE 2 transmits a requested radio signal in a first time-frequency resource group; otherwise, the UE 2 performs channel sensing to determine whether to transmit a requested radio signal. When the UE 2 is outside the serving cell of the UE 1, whether the UE 2 responds to the request of the UE 1 considers the interference of peripheral nodes (e.g., a UE, a relay, or a base station) around the UE 2, thus reducing the probability of traffic conflicts and improving the transmission reliability.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
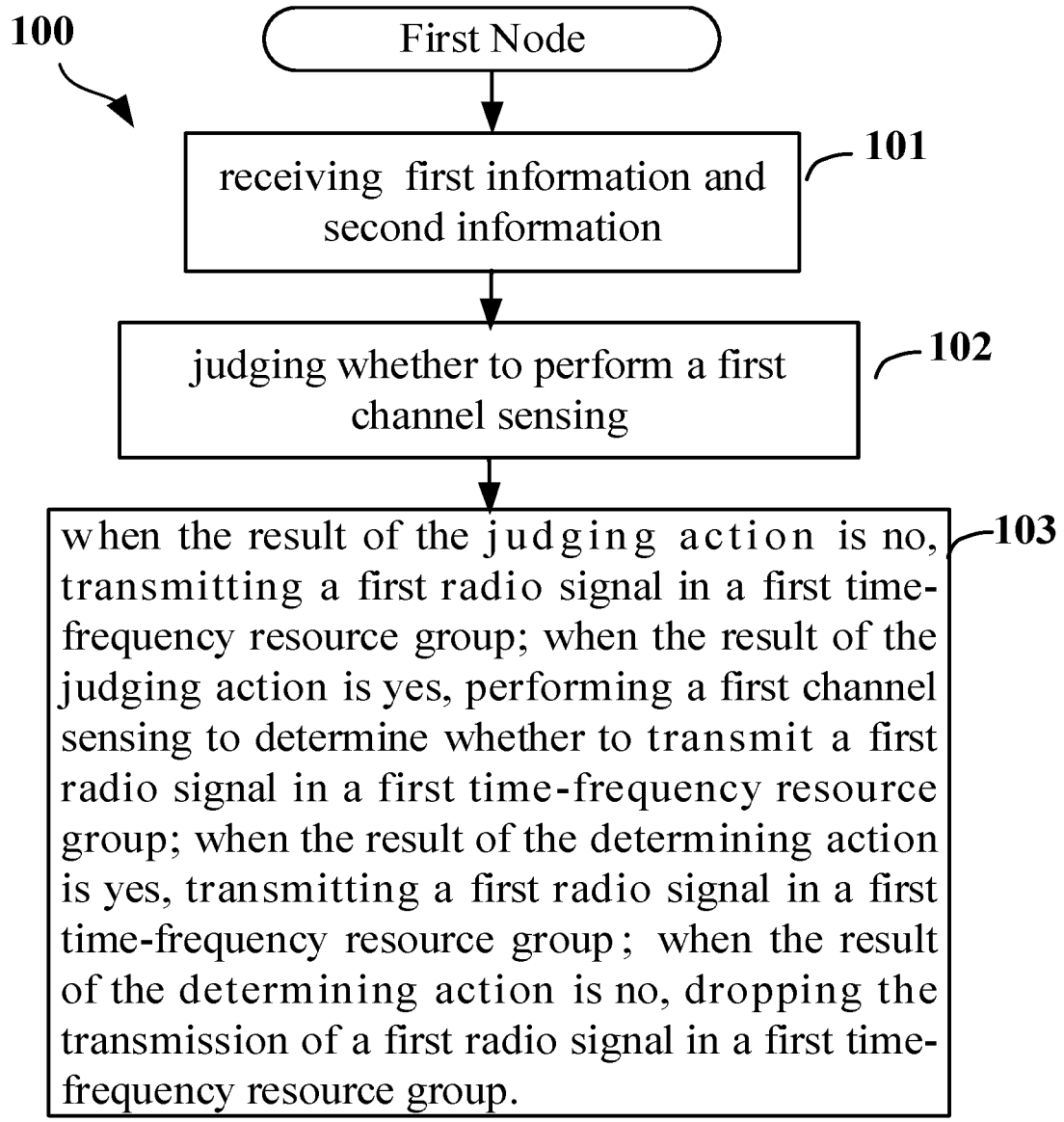
FIG. 1 illustrates a flowchart of first information, second information, a first channel sensing and a first radio signal according to one embodiment of the present disclosure.

Embodiment 1 illustrates a flowchart of first information, second information, a first channel sensing and a first radio signal according to one embodiment of the present disclosure, as shown in FIG. 1. In FIG. 1, each box represents a step. It should be noted that the order of each box in the diagram does not represent the chronological relationship between the steps presented.

In Embodiment 1, a first node in the present disclosure receives first information and second information in step S101; judges whether a first channel sensing is performed in step S102; when the result of the judging is no in step S103, transmits a first radio signal in the first time-frequency resource group; when the result of the judging action is yes, performs the first channel sensing to determine whether to transmit a first radio signal in the first time-frequency resource group, when the result of the determining action is yes, transmits the first radio signal in the first time-frequency resource group, and when the result of the determining action is no, drops the transmission of the first radio signal in the first time-frequency resource group. Herein, the first information is used to determine whether the first node and a transmitter of the second information belong to a same serving cell, and the first information is used to judge whether to perform the first channel sensing.

In one embodiment, the first information is carried by a higher-layer signaling.

In one embodiment, the first information is carried by a physical-layer signaling.

In one embodiment, the first information is Broadcast.

In one embodiment, the first information is Groupcast.

In one embodiment, the first information is Unicast.

In one embodiment, the first information is Cell-Specific.

In one embodiment, the first information is UE group-specific.

In one embodiment, the first information is UE-specific.

In one embodiment, the first information is transmitted through Sidelink.

In one embodiment, the first information is transmitted through a Physical Sidelink Broadcast Channel (PSBCH).

In one embodiment, the first information is transmitted through a Sidelink Discovery Channel (SL-DCH).

In one embodiment, the first information is transmitted through a Physical Sidelink Discovery Channel (PSDCH).

In one embodiment, the first information is transmitted through a Sidelink Shared Channel (SL-SCH).

In one embodiment, the first information is transmitted through a Physical Sidelink Shared Channel (PSSCH).

In one embodiment, the first information is transmitted through a Physical Sidelink Control Channel (PSCCH).

In one embodiment, the first information comprises all or part of Fields of a Sidelink Control Information (SCI) signaling.

In one embodiment, the first information comprises one or more Fields in a Master Information Block (MIB).

In one embodiment, the first information comprises one or more Fields in a System Information Block (SIB).

In one embodiment, the first information comprises one or more Fields in Remaining System Information (RMSI).

In one embodiment, the first information comprises all or part of Fields in an Information Element (IE) in a Radio Resource Control (RRC) signaling.

In one embodiment, the first information is carried by a MAC CE signaling.

In one embodiment, the first information is transmitted through a Downlink Shared Channel (DL-SCH).

In one embodiment, the first information is transmitted through a Physical Downlink Shared Channel (PDSCH).

In one embodiment, the first information is transmitted through a Physical Downlink Control Channel (PDCCH).

In one embodiment, the first information comprises all or part of Fields of a Downlink Control Information (DCI) signaling.

In one embodiment, the first information is transmitted through a radio interface of a Sidelink.

In one embodiment, the first information is transmitted through a radio interface between UEs.

In one embodiment, the first information is transmitted through a radio interface between a UE and a base station.

In one embodiment, the first information is transmitted through a Uu interface.

In one embodiment, the first information is transmitted through a PC5 interface.

In one embodiment, the first information is transmitted through a radio signal.

In one embodiment, the first information is transmitted from a base station to the first node.

In one embodiment, the first information is transmitted from a serving cell of the first node to the first node.

In one embodiment, the first information is transmitted from the third node in the present disclosure to the first node.

In one embodiment, the first information is transmitted from the transmitter of the second information in the present disclosure to the first node.

In one embodiment, the first information is transferred from a higher layer of the first node to a physical layer of the first node.

In one embodiment, the first information is transferred inside the first node.

In one embodiment, the first information comprises an identification of a Public Land Mobile Network (PLMN) of a serving cell in which the transmitter of the second information resides.

In one subembodiment of the above embodiment, when the identification of the PLMN of the serving cell in which the transmitter of the second information resides is the same as that of the PLMN of the serving cell in which the first node resides, the first node and a transmitter of the second information belong to a same serving cell.

In one subembodiment of the above embodiment, when the identification of the PLMN of the serving cell in which the transmitter of the second information resides is different from that of the PLMN of the serving cell in which the first node resides, the first node and a transmitter of the second information don't belong to a same serving cell.

In one embodiment, the first information comprises a physical cell identification of the serving cell where the transmitter of the second information resides.

In one subembodiment of the above embodiment, when a physical cell identification of the serving cell where the transmitter of the second information resides is the same as that of a serving cell where the first node resides, the first node and a transmitter of the second information belong to a same serving cell.

In one subembodiment of the above embodiment, when the physical cell identification of a serving cell where the transmitter of the second information resides is different from that of a serving cell where the first node resides, the first node and a transmitter of the second information do not belong to a same serving cell.

In one embodiment, the first information comprises a globally unique cell identification of a serving cell in which the transmitter of the second information resides.

In one subembodiment of the above embodiment, when a globally unique cell identification of a serving cell where the transmitter of the second information resides is the same as that of a serving cell where the first node resides, the first node and a transmitter of the second information belong to a same service cell.

In one subembodiment of the above embodiment, when a globally unique cell identification of a serving cell where the transmitter of the second information resides is different from that of a serving cell where the first node resides, the first node and a transmitter of the second information don't belong to a same service cell.

In one embodiment, the second information is carried by a physical layer signaling.

In one embodiment, the second information is Broadcast.

In one embodiment, the second information is Groupcast.

In one embodiment, the second information is Unicast.

In one embodiment, the second information is Cell-Specific.

In one embodiment, the second information is UE group-specific.

In one embodiment, the second information is UE-specific.

In one embodiment, the second information is transmitted through a Sidelink.

In one embodiment, the second information is transmitted through a Physical Sidelink Control Channel (PSCCH).

In one embodiment, the second information comprises all or part of Fields of a Sidelink Control Information (SCI) signaling.

In one embodiment, the second information is transmitted through a radio interface of a Sidelink.

In one embodiment, the second information is transmitted through a radio interface between UEs.

In one embodiment, the second information is transmitted through a PC5 interface.

In one embodiment, the second information is transmitted through a radio signal.

In one embodiment, a transmitter of the second information is the same as a transmitter of the first information.

In one embodiment, a transmitter of the second information is different from a transmitter of the first information.

In one embodiment, both the first information and the second information belong to a same signaling.

In one embodiment, the first information and the second information belong to two different signalings respectively.

In one embodiment, both the first information and the second information belong to a same DCI signaling.

In one embodiment, the first information and the second information belong to two DCI signalings respectively.

In one embodiment, the first information and the second information belong to a same SCI signaling.

In one embodiment, the first information and the second information belong to two SCI signalings respectively.

In one embodiment, the first time-frequency resource group comprises time-frequency resources reserved for the first radio signal.

In one embodiment, the first time-frequency resource group is reserved for feedback of Hybrid Automatic Repeat Request (HARD).

In one embodiment, the first time-frequency resource group is reserved for feedback of Channel-State Information (CSI).

In one embodiment, the first radio signal is transmitted in the first time-frequency resource group, and the first time-frequency resource group comprises time-frequency resources occupied by the first radio signal.

In one embodiment, the first time-frequency resource group comprises a positive integer number of Resource Element(s) (RE).

In one embodiment, the first time-frequency resource group comprises a positive integer number of multi-carrier symbol(s) in time domain.

In one embodiment, the first time-frequency resource group comprises a positive integer number of slot(s) in time domain.

In one embodiment, the first time-frequency resource group comprises a positive integer number of sub-frame(s) in time domain.

In one embodiment, the first time-frequency resource group appears multiple times in time domain.

In one subembodiment of the above embodiment, an interval between any two adjacent occurrences of the first time-frequency resource group in time domain is equal.

In one subembodiment of the above embodiment, an interval between any two adjacent occurrences of the first time-frequency resource group in time domain is a positive integral multiple of a first interval; the first interval comprises a positive integer number of consecutive multi-carrier symbols, or, the first interval comprises a positive integer number of consecutive time slots, or, the first interval comprises a positive integer number of consecutive subframes.

In one embodiment, the first time-frequency resource group appears only once in time domain.

In one embodiment, the first time-frequency resource group comprises a positive integer number of sub-carrier(s) in frequency domain.

In one embodiment, the first time-frequency resource group comprises a positive integer number of Physical resource block(s) (PRB) in frequency domain.

In one embodiment, the first time-frequency resource group comprises a positive integer number of sub-channel(s) in frequency domain.

In one embodiment, the first time-frequency resource group belongs to time-frequency resources allocated to a Physical Sidelink Feedback Channel (PSFCH).

In one embodiment, the first time-frequency resource group belongs to time-frequency resources allocated to a PSCCH.

In one embodiment, the first time-frequency resource group belongs to the time-frequency resource allocated to a PSSCH.

In one embodiment, the second information is used to indicate the first time-frequency resource group.

In one embodiment, the second information directly indicates the first time-frequency resource group.

In one embodiment, the second information indirectly indicates the first time-frequency resource group.

In one embodiment, the second information explicitly indicates the first time-frequency resource group.

In one embodiment, the second information implicitly indicates the first time-frequency resource group.

In one embodiment, the second information indicates that a first time-frequency resource group is reserved.

In one embodiment, the first time-frequency resource group is associated with time-frequency resources occupied by the second information.

In one embodiment, time-frequency resources occupied by the second information are used to determine the first time-frequency resource group.

In one embodiment, time-frequency resources occupied by the second information are associated with the first time-frequency resource group. The first time-frequency resource group can be inferred according to time-frequency resources occupied by the second information.

In one embodiment, time-domain resources occupied by the first time-frequency resource group can be inferred from time-domain resources occupied by the second information.

In one embodiment, a time interval between time-domain resources occupied by the second information and time-domain resources occupied by the first time-frequency resource group is predefined or configurable.

In one embodiment, a time interval between time domain resources occupied by the second information and time domain resources occupied by the first time-frequency resource group is not less than a first time interval, and the first time interval is predefined or configurable.

In one embodiment, time-domain resources occupied by the second information belong to a first time unit, and time-domain resources occupied by the first time-frequency resource group belong to a second time unit. A time interval between the first time unit and the second time unit is predefined or configurable.

In one embodiment, time-domain resources occupied by the second information belong to a first time unit, and time-domain resources occupied by the first time-frequency resource group belong to a second time unit. A time interval between the first time unit and the second time unit is not less than a reference time unit, and the reference time unit is predefined or configurable.

In one subembodiment of the above embodiment, the first time unit comprises a slot, the second time unit comprises a slot, and the reference time unit comprises a positive integer number of slot(s).

In one subembodiment of the above embodiment, the first time unit comprises a subframe, the second time unit comprises a subframe, and the reference time unit comprises a positive integer number of subframe(s).

In one subembodiment of the above embodiment, the second time unit is a time unit in a reference time unit set, the reference time unit set comprises a positive integer number of time unit(s), the second time unit is a time unit in the reference time unit set that is later than the first time unit in time domain, and a time interval between the second time unit and the first time unit is not smaller than an earliest time unit in the reference time unit set.

In one embodiment, a time interval between the first time unit and the second time unit is a difference obtained by subtracting a starting time of the first time unit from a starting time of the second time unit.

In one embodiment, a time interval between the first time unit and the second time unit is a difference obtained by subtracting an index of the first time unit from an index of the second time unit.

In one embodiment, a time interval between the first time unit and the second time unit is measured by slot.

In one embodiment, a time interval between the first time unit and the second time unit is measured by subframe.

In one embodiment, a time interval between the first time unit and the second time unit measured by millisecond (ms).

In one embodiment, frequency-domain resources occupied by the first time-frequency resource group can be inferred according to frequency domain resources occupied by the second information.

In one embodiment, frequency-domain resources occupied by the second information and frequency-domain resources occupied by the first time-frequency resource group belong to a same BandWidth Part (BWP).

In one embodiment, frequency-domain resources occupied by the second information and frequency-domain resources occupied by the first time-frequency resource group belong to a same Subband.

In one embodiment, frequency-domain resources occupied by the second information and frequency-domain resources occupied by the first time-frequency resource group belong to a same Carrier.

In one embodiment, frequency-domain resources occupied by the second information and frequency-domain resources occupied by the first time-frequency resource group belong to a same Subchannel.

In one embodiment, a frequency-domain interval between frequency-domain resources occupied by the second information and frequency domain resources occupied by the first time-frequency resource group is predefined or configurable.

In one subembodiment of the above embodiment, the frequency-domain interval between the frequency-domain resources occupied by the second information and the frequency-domain resources occupied by the first time-frequency resource group is a difference obtained by subtracting an index of the lowest subcarrier occupied by the second information from an index of the lowest subcarrier occupied by the first time-frequency resource group.

In one subembodiment of the above embodiment, the frequency-domain interval between the frequency-domain resources occupied by the second information and the frequency-domain resources occupied by the first time-frequency resource group is a difference obtained by subtracting an index of the lowest RB occupied by the second information from an index of the lowest RB occupied by the first time-frequency resource group.

In one subembodiment of the above embodiment, a unit of a frequency-domain interval between the frequency domain resources occupied by the second information and the frequency domain resources occupied by the first time-frequency resource group is a subcarrier.

In one subembodiment of the above embodiment, a frequency-domain interval between the frequency-domain resources occupied by the second information and the frequency-domain resources occupied by the first time-frequency resource group is measured by Resource Block (RB).

In one embodiment, the first time-frequency resource group belongs to a selection window in time domain.

In one embodiment, the first time-frequency resource group is associated with the second information.

In one embodiment, the second information is used to indicate time-frequency resources occupied by a second radio signal, and the first time-frequency resource group is associated with the time-frequency resources occupied by the second radio signal.

In one subembodiment of the above embodiment, the first radio signal is related to the second radio signal.

In one subembodiment of the above embodiment, the first time-frequency resource group may be inferred from time-frequency resources occupied by the second radio signal.

In one subembodiment of the above embodiment, time-domain resources occupied by the first time-frequency resource group can be inferred according to time-domain resources occupied by the second radio signal.

In one subembodiment of the above embodiment, a time interval between time-domain resources occupied by the second radio signal and time-domain resources occupied by the first time-frequency resource group is predefined or configurable.

In one subembodiment of the above embodiment, a time interval between time-domain resources occupied by the second radio signal and time-domain resources occupied by the first time-frequency resource group is not less than a second time interval, and the second time interval is predefined or configurable.

In one subembodiment of the above embodiment, time-domain resources occupied by the second radio signal belong to a third time unit, time-domain resources occupied by the first time-frequency resource group belong to a fourth time unit, and a time interval between the third time unit and the fourth time unit is predefined or configurable.

In one subembodiment of the above embodiment, time-domain resources occupied by the second radio signal belong to a third time unit, time-domain resources occupied by the first time-frequency resource group belong to a fourth time unit, and a time interval between the third time unit and the fourth time unit is not less than a second reference time unit, the second reference time unit is predefined or configurable.

In one subembodiment of the above embodiment, time-domain resources occupied by the second radio signal belong to a third time unit, time-domain resources occupied by the first time-frequency resource group belong to a fourth time unit, the third time unit is a time unit in a second reference time unit set, and the second reference time unit set comprises a positive integer number of time unit(s). The fourth time unit is the earliest time unit in the second reference time unit set which is later than the third time unit in time domain and a time interval between which and the third time window is not less than a second reference time unit, and the second reference time unit is predefined or configurable.

In one subembodiment of the above embodiment, the third time unit comprises a slot, the fourth time unit comprises a slot, the second reference time unit comprises a positive integer number of slot(s), and the time unit comprises a slot.

In one subembodiment of the above embodiment, the third time unit comprises a subframe, the fourth time unit comprises a subframe, the second reference time unit comprises a positive integer number of subframe(s), and the time unit comprises a subframe.

In one subembodiment of the above embodiment, a time interval between the third time unit and the fourth time unit is a difference obtained by subtracting a starting time of the third time unit from a starting time of the fourth time unit.

In one subembodiment of the above embodiment, a time interval between the third time unit and the fourth time unit is a difference obtained by subtracting an index of the third time unit from an index of the fourth time unit.

In one subembodiment of the above embodiment, a time interval between the third time unit and the fourth time unit is measured by slot.

In one subembodiment of the above embodiment, a time interval between the third time unit and the fourth time unit is measured by subframe.

In one subembodiment of the above embodiment, a time interval between the third time unit and the fourth time unit is measured by ms.

In one subembodiment of the above embodiment, frequency domain resources occupied by the first time-frequency resource group can be inferred from frequency domain resources occupied by the second radio signal.

In one subembodiment of the above embodiment, frequency-domain resources occupied by the second radio signal and frequency-domain resources occupied by the first time-frequency resource group belong to a same BandWidth Part (BWP).

In one subembodiment of the above embodiment, frequency domain resources occupied by the second radio signal and frequency domain resources occupied by the first time-frequency resource group belong to a same sub-band.

In one subembodiment of the above embodiment, frequency-domain resources occupied by the second radio signal and frequency-domain resources occupied by the first time-frequency resource group belong to a same carrier.

In one subembodiment of the above embodiment, frequency-domain resources occupied by the second radio signal and frequency-domain resources occupied by the first time-frequency resource group belong to a same subchannel.

In one subembodiment of the above embodiment, a frequency-domain interval between frequency-domain resource occupied by the second radio signal and frequency-domain resources occupied by the first time-frequency resource group is predefined or configurable.

In one subembodiment of the above embodiment, the frequency-domain interval between the frequency-domain resources occupied by the second radio signal and the frequency-domain resource occupied by the first time-frequency resource group is a difference obtained by subtracting an index of a lowest subcarrier occupied by the second radio signal from an index of a lowest subcarrier occupied by the first time-frequency resource group.

In one subembodiment of the above embodiment, the frequency-domain interval between the frequency-domain resources occupied by the second radio signal and the frequency-domain resources occupied by the first time-frequency resource group is a difference obtained by subtracting an index of a lowest RB occupied by the second radio signal from an index of a lowest RB occupied by the first time-frequency resource group.

In one subembodiment of the above embodiment, a frequency-domain interval between the frequency-domain resources occupied by the second radio signal and the frequency domain resources occupied by the first time-frequency resource group is measured by subcarrier.

In one subembodiment of the above embodiment, a frequency-domain interval between the frequency-domain resources occupied by the second radio signal and the frequency-domain resources occupied by the first time-frequency resource group is measured by Resource Block (RB).

In one embodiment, the first radio signal is Unicast.

In one embodiment, the first radio signal is Groupcast.

In one embodiment, the first radio signal is Broadcast.

In one embodiment, the first radio signal is transmitted through a data channel.

In one embodiment, the first radio signal is transmitted through Sidelink.

In one embodiment, the first radio signal is transmitted through a radio interface between UEs.

In one embodiment, the first radio signal is transmitted through a radio interface employed for communication between the first node and the second node in the present disclosure.

In one embodiment, the first radio signal is transmitted through a radio interface of a Sidelink.

In one embodiment, the first radio signal is transmitted through a PC5 interface.

In one embodiment, the first radio signal is transmitted through a Sidelink Shared Channel (SL-SCH).

In one embodiment, the first radio signal is transmitted through a Physical Sidelink Shared Channel (PSSCH).

In one embodiment, the first radio signal is transmitted through a PSFCH.

In one embodiment, the first radio signal is transmitted through a PSCCH.

In one embodiment, the first radio signal is triggered by a signaling carrying the second information.

In one embodiment, the first radio signal comprises a transport block (TB).

In one embodiment, the first radio signal carries CSI.

In one subembodiment of the above embodiment, the CSI comprises at least one of Rank indicator (RI), Precoding Matrix Indicator (PMI), Channel Quality Indicator (CQI), Reference Signal Received Power (RSRP) or Csi-reference signal Resource Indicator (CRI).

In one embodiment, the first radio signal carries a HARQ.

In one embodiment, the first channel sensing comprises sensing.

In one embodiment, the first channel sensing comprises energy detection, that is, sensing the energy of a radio signal and averaging the energy to obtain an average received energy.

In one embodiment, the first channel sensing comprises power detection, that is, sensing the power of a radio signal and averaging the power to obtain an average received power.

In one embodiment, the first channel sensing comprises coherent detection, that is, performing the coherent reception and measuring an average energy of the signal obtained after the coherent reception.

In one embodiment, the first channel sensing comprises coherent detection, that is, performing the coherent reception and measuring an average power of the signal obtained after the coherent reception.

In one embodiment, the phrase that dropping the transmission of the first radio signal in the first time-frequency resource group comprises dropping transmitting any radio signal in the first time-frequency resource group.

In one embodiment, the phrase that dropping the transmission of the first radio signal in the first time-frequency resource group comprises dropping transmitting any radio signal other than the first radio signal in the first time-frequency resource group.

In one embodiment, the phrase that dropping the transmission of the first radio signal in the first time-frequency resource group comprises transmitting radio signals other than the first radio signal in the first time-frequency resource group.

In one embodiment, the phrase that dropping the transmission of the first radio signal in the first time-frequency resource group comprises releasing a cache for information bits used to store the first radio signal.

In one embodiment, the phrase that dropping the transmission of the first radio signal in the first time-frequency resource group comprises dropping the transmission of the information bits corresponding to the first radio signal in the first time-frequency resource group.

In one embodiment, the phrase that dropping the transmission of the first radio signal in the first time-frequency resource group comprises transmitting information bits other than information bits corresponding to the first radio signal in the first time-frequency resource group.

In one embodiment, the phrase that dropping the transmission of the first radio signal in the first time-frequency resource group comprises dropping the transmission of the information bits corresponding to the first radio signal.

In one embodiment, the phrase that dropping the transmission of the first radio signal in the first time-frequency resource group comprises postponing the transmission of the information bits corresponding to the first radio signal.

In one embodiment, the phrase that dropping the transmission of the first radio signal in the first time-frequency resource group comprises performing channel measurement in the first time-frequency resource group.

In one embodiment, the phrase that dropping the transmission of the first radio signal in the first time-frequency resource group comprises receiving a radio signal in the first time-frequency resource group.

Embodiment 2

Figure 2:
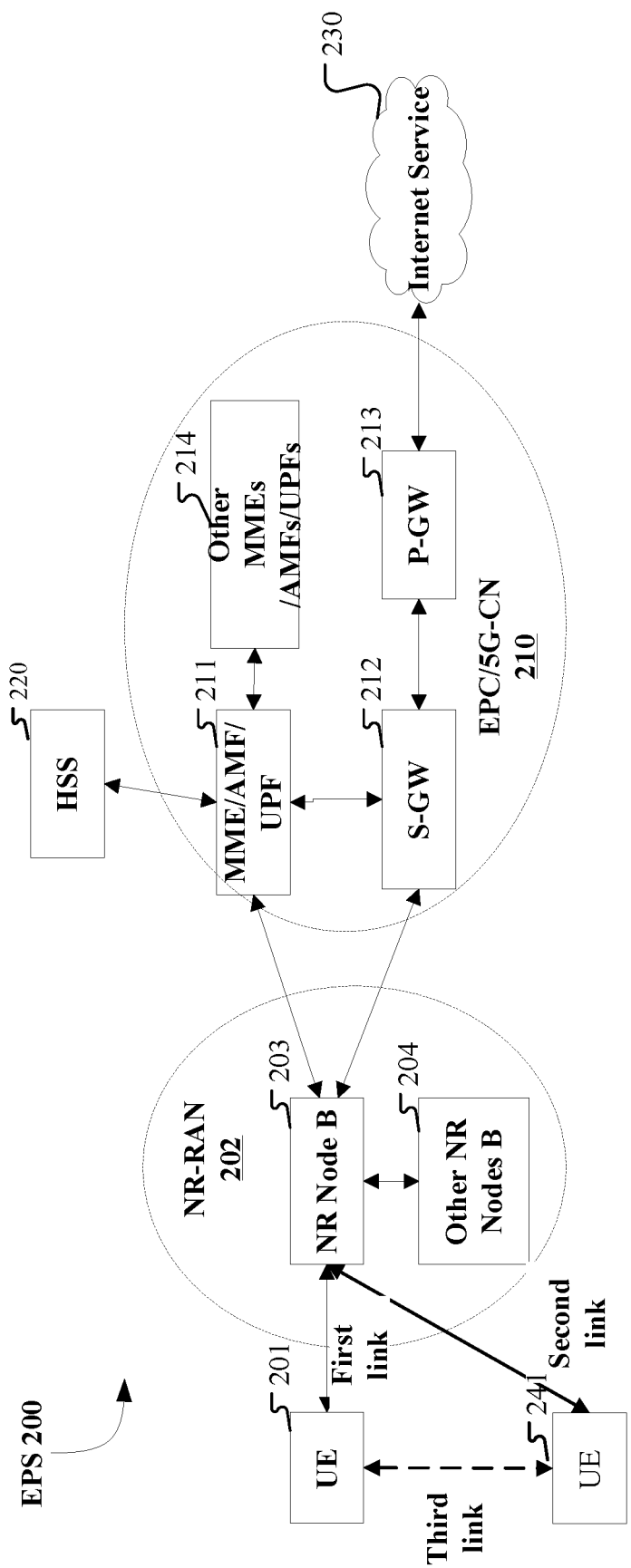
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 shows the network architecture 200 of 5G NR, Long-Term Evolution (LTE) and Long-Term Evolution Advanced (LTE-A). The NR 5G or LTE network architecture 200 may be called an Evolved Packet System (EPS) 200 or other applicable terminology. The EPS 200 may comprise one or more UEs 201, an NG-RAN 202, a Network Evolved Packet Core/5G-Core (EPC/5G-CN) 210, a Home Subscriber Server (HSS) 220 and an Internet Service 230. The EPS 200 may be interconnected with other access networks.

For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE201 corresponds to the first node in the present disclosure.

In one embodiment, the UE201 supports transmission in a sublink.

In one embodiment, the UE201 supports a PC5 interface.

In one embodiment, the UE201 supports a Uu interface.

In one embodiment, the UE201 supports Internet of Vehicles.

In one embodiment, the UE201 supports V2X traffic.

In one embodiment, the UE241 corresponds to the second node in the present disclosure.

In one embodiment, the UE241 supports transmission in a sublink.

In one embodiment, the UE241 supports a PC5 interface.

In one embodiment, the UE241 supports a Uu interface.

In one embodiment, the UE241 supports Internet of Vehicles.

In one embodiment, the UE241 supports V2X traffic.

In one embodiment, the gNB203 corresponds to the second node in the present disclosure.

In one embodiment, the gNB203 supports Internet of Vehicles.

In one embodiment, the gNB203 supports V2X traffic.

In one embodiment, the gNB203 supports a PC5 interface.

Embodiment 3

Figure 3:
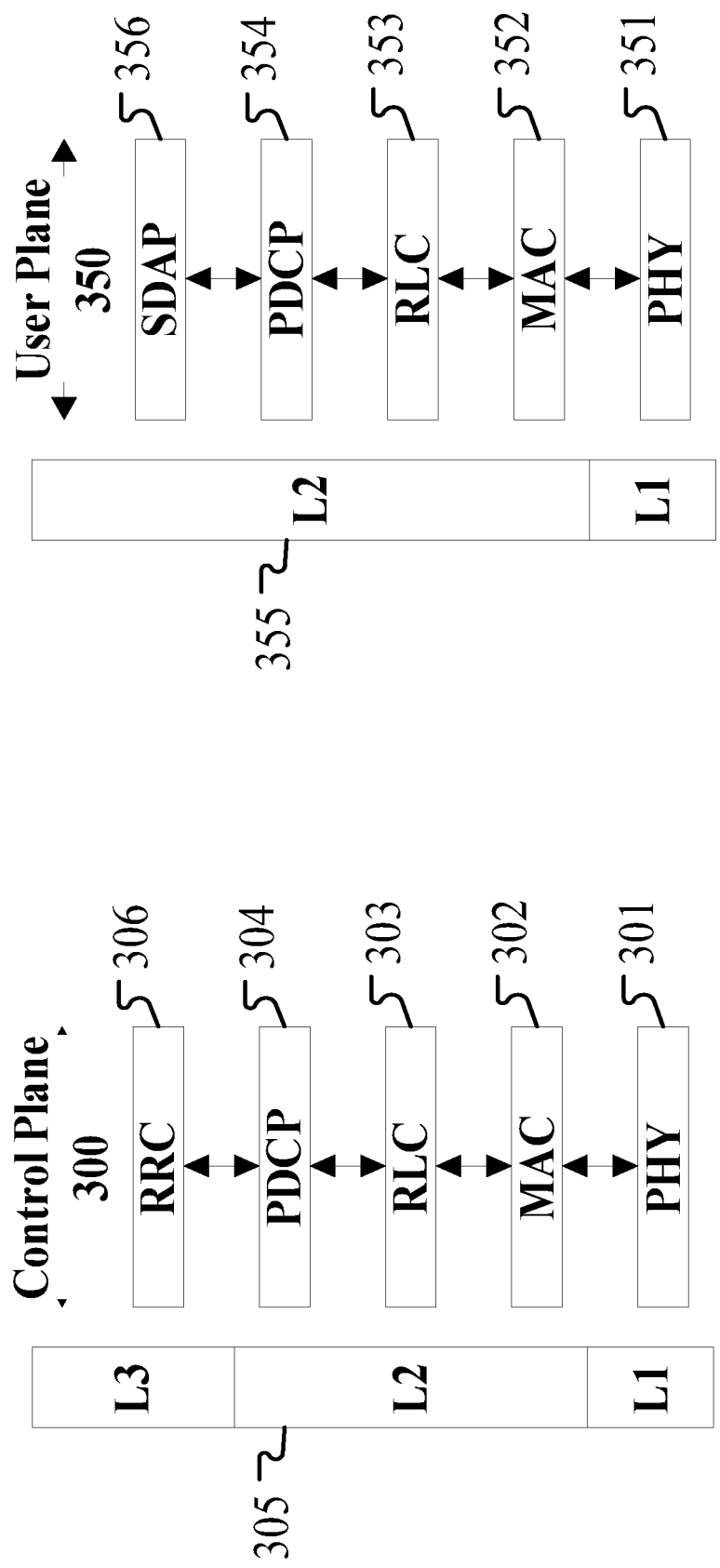
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating an embodiment of a radio protocol architecture for user plane 350 and control plane 300. FIG. 3 shows a radio protocol architecture of a control plane 300 between a first communication node (UE, gNB or RSU in V2X) and a second communication node (gNB, UE or RSU in V2X), or between two UEs, which is represented in three layers: Layer 1, 2 and 3. Layer 1 (L1) is the lowest layer and implements various physical layer (PHY) signal processing functions. Layer L1 will be called PHY301 in this disclosure. Layer 2 (L2) 305 is above PHY 301 and is responsible for links between a first communication node and a second communication node, and between the two UEs through the PHY 301. Layer L2 305 comprises a Medium Access Control (MAC) sublayer 302, a Radio Link Control (RLC) sublayer 303 and a Packet Data Convergence Protocol (PDCP) sublayer 304, which terminate at the second communication node. The PDCP sublayer 304 provides multiplexing between different radio bearers and logical channels. The PDCP sublayer 304 also provides security by encrypting data packets, as well as supports for the handover of the first communication node between the second communication nodes. The RLC sublayer 303 provides segmentation and reassembling of a higher-layer packet, retransmission of a lost packet, and reordering of a packet to compensate for disordered reception caused by HARQ. The MAC sublayer 302 provides multiplexing between logic and transport channels. The MAC sublayer 302 is also responsible for allocating various radio resources (e.g., resource blocks) in a cell between the first communication nodes. The MAC sublayer 302 is also responsible for HARQ operations. The Radio Resource Control (RRC) sublayer 306 in layer 3 (L3) of control plane 300 is responsible for obtaining radio resources (i.e., radio bearer) and configuring the lower layer with an RRC signaling between the second communication node and the first communication node. The radio protocol architecture of the user plane 350 comprises layer 1 (L1) and layer 2 (L2). In user plane 350, the radio protocol architecture for a first communication node and a second communication node applied in the physical layer 351, the PDCP sublayer 354 in L2 sublayer 355, the RLC sublayer 353 in L2 layer 355 and the MAC sublayer 352 in L2 layer 355 is roughly the same as that applied in corresponding layers and sublayers in the control plane 300, but the PDCP sublayer 354 also provides header compression for a higher layer packet to reduce radio transmission overhead. The L2 355 in user plane 350 also comprises Service Data Adaptation Protocol (SDAP) sublayer 356, which is responsible for the mapping between QoS flow and Data Radio Bearer (DRB) to support the diversity of traffics. Although not shown, the first communication node may comprise several higher layers above L2 layer 355, including a network layer (e.g., IP layer) terminating at P-GW of the network side and an application layer terminating at the other side of the connection (e.g., peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the PHY 301.

In one embodiment, the first information in the present disclosure is generated by the SDAP sublayer 356.

In one embodiment, the first information in the present disclosure is generated by the MAC sublayer 352.

In one embodiment, the first information in the present disclosure is generated by the PHY 351.

In one embodiment, the second information in the present disclosure is generated by the RRC sublayer 306.

In one embodiment, the second information in the present disclosure is generated by the MAC sublayer 302.

In one embodiment, the second information in the present disclosure is generated by the PHY 301.

In one embodiment, the second information in the present disclosure is generated by the SDAP sublayer 356.

In one embodiment, the second information in the present disclosure is generated by the MAC sublayer 352.

In one embodiment, the second information in the present disclosure is generated by the PHY 351.

In one embodiment, the third information in the present disclosure is generated by the RRC sublayer 306.

In one embodiment, the third information in the present disclosure is generated by the MAC sublayer 302.

In one embodiment, the third information in the present disclosure is generated by the PHY 301.

In one embodiment, the third information in the present disclosure is generated by the SDAP sublayer 356.

In one embodiment, the third information in the present disclosure is generated by the MAC sublayer 352.

In one embodiment, the third information in the present disclosure is generated by the PHY 351.

In one embodiment, the action of judging whether to perform a first channel sensing in the present disclosure is generated by the RRC sublayer 306.

In one embodiment, the action of judging whether to perform a first channel sensing in the present disclosure is generated by the MAC sublayer 302.

In one embodiment, the action of judging whether to perform a first channel sensing in the present disclosure is generated by the SDAP sublayer 356.

In one embodiment, the action of judging whether to perform a first channel sensing in the present disclosure is generated by the MAC sublayer 352.

In one embodiment, the action of judging whether to perform a first channel sensing in the present disclosure is generated by the PHY 351.

In one embodiment, the first radio signal in the present disclosure is generated by the PHY 301.

In one embodiment, the first radio signal in the present disclosure is generated by the PHY 351.

In one embodiment, the second radio signal in the present disclosure is generated by the PHY 301.

In one embodiment, the second radio signal in the present disclosure is generated by the PHY 351.

In one embodiment, the first signaling group in the present disclosure is generated by the RRC sublayer 306.

In one embodiment, the first signaling group in the present disclosure is generated by the MAC sublayer 302.

In one embodiment, the first signaling group in the present disclosure is generated by the PHY 301.

In one embodiment, the first signaling group in the present disclosure is generated by the SDAP sublayer 356.

In one embodiment, the first signaling group in the present disclosure is generated by the MAC sublayer 352.

In one embodiment, the first signaling group in the present disclosure is generated by the PHY 351.

In one embodiment, the second signaling group in the present disclosure is generated by the RRC sublayer 306.

In one embodiment, the second signaling group in the present disclosure is generated by the MAC sublayer 302.

In one embodiment, the second signaling group in the present disclosure is generated by the PHY 301.

In one embodiment, the second signaling group in the present disclosure is generated by the SDAP sublayer 356.

In one embodiment, the second signaling group in the present disclosure is generated by the MAC sublayer 352.

In one embodiment, the second signaling group in the present disclosure is generated by the PHY 351.

Embodiment 4

Figure 4:
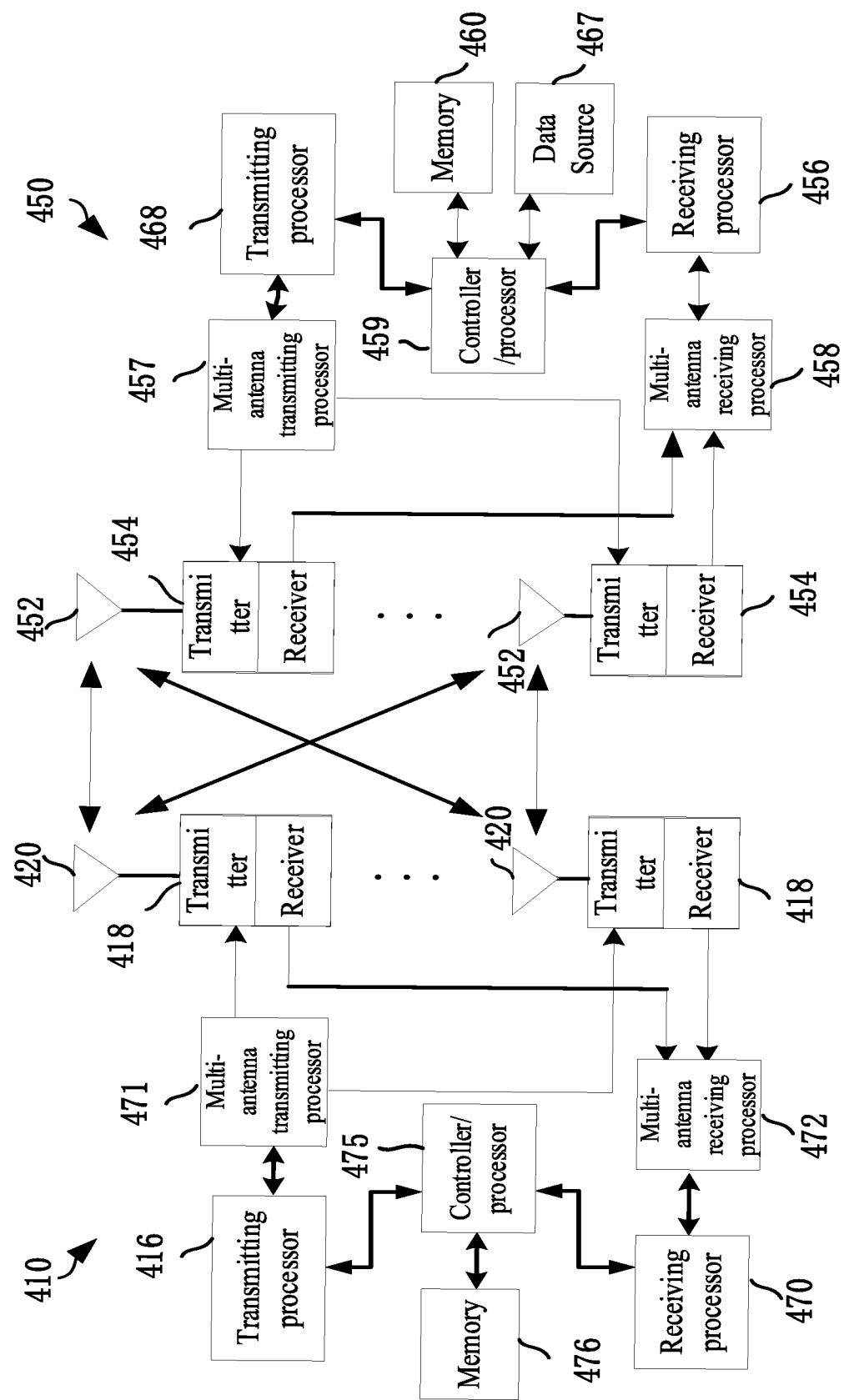
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 communicating with each other in access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In the transmission from the first communication device 410 to the second communication device 450, at the first communication device 410, a higher layer packet from the core network is provided to a controller/processor 475. The controller/processor 475 implements the functionality of L2 layer. In the transmission from the first communication device 410 to the first communication device 450, the controller/processor 475 provides header compression, encryption, packet segmentation and reordering, multiplexing between logic and transport channels, and radio resources allocation to the second communication device 450 based on various priority metrics. The controller/processor 475 is also responsible for retransmission of a lost packet and a signaling to the second communication device 450. The transmitting processor 416 and the multi-antenna transmitting processor 471 implement various signal processing functions on the layer L1 (i.e., the physical layer). The transmitting processor 416 implements encoding and interleaving to facilitate forward error correction (FEC) at the second communication device 450, and mapping of signal clusters based on various modulation schemes (e.g., binary phase shift keying (BPSK), quadrature phase shift keying (QPSK), M-phase shift keying (M-PSK), and M quadrature amplitude modulation (M-QAM)). The multi-antenna transmitting processor 471 performs digital spatial precoding on the encoded and modulated symbols, including codebook-based precoding and non-codebook-based precoding, and beamforming processing to generate one or more spatial streams. The transmitting processor 416 then maps each spatial stream onto a subcarrier, multiplexes it with reference signals (e.g., pilot) in time and/or frequency domain, and then uses the Inverse Fast Fourier Transform (IFFT) to generate a physical channel carrying a time-domain multicarrier symbol stream. Then a multi-antenna transmitting processor 471 performs transmission analog precoding/beamforming operation on the time-domain multicarrier symbol stream. Each transmitter 418 converts the baseband multi-carrier symbol stream provided by the multi-antenna transmitting processor 471 into a radio-frequency stream, which is then provided to different antennas 420.

In the transmission from the first communication device 410 to the second communication device 450, at the second communication device 450, each receiver 454 receives a signal through its corresponding antenna 452. Each receiver 454 recovers the information modulated to the radio frequency carrier and converts the radio frequency stream into a baseband multicarrier symbol stream to be provided to a receiving processor 456. The receiving processor 456 and a multi-antenna receiving processor 458 implement various signal processing functions of the layer L1. The multi-antenna receiving processor 458 performs receiving analog precoding/beamforming operation on the baseband multi-carrier symbol stream from the receiver 454. The receiving processor 456 uses FFT to convert the baseband multi-carrier symbol streams operated by receiving analog precoding/beamforming operation from time domain to frequency domain. In frequency domain, the physical layer data signal and the reference signal are demultiplexed by the receiving processor 456, wherein the reference signal is to be used for channel estimation, and data signal goes through multi-antenna detection in the multi-antenna receiving processor 458 to recover any spatial stream destined for the second communication device 450. Symbols on each spatial stream are demodulated and restored in the receiving processor 456, and a soft decision is generated. The receiving processor 456 then decodes and deinterleaves the soft decision to recover the higher-layer data and control signals transmitted by the first communication device 410 on a physical channel. The higher-layer data and the control signal are then provided to the controller/processor 459. The controller/processor 459 implements functions of layer L2. The controller/processor 459 may be associated with a memory 460 that stores program code and data. The memory 460 may be called a computer readable medium. In the transmission from the first communication device 410 to the second communication device 450, the controller/processor 459 provides demultiplexing, packet reassembling, decryption, header decompression and signal control processing between transport and logical channels, to recover a higher-layer packet from the core network. The higher-layer packet is then provided to all protocol layers above the layer L2, or various control signals can be provided to L3 for processing.

In the transmission from the second communication device 450 to the first communication device 410, at the second communication device 450, a data source 467 is used to provide a higher layer data packet to a controller/processor 459. The data source 467 represents all protocol layers above the L2 layer. Similar to the transmission function at the first communication device 410 described in the transmission from the first communication device 410 to the second communication device 450, the controller/processor 459 implements multiplexing between header compression, encryption, packet segmentation, reordering, logical and transport channels based on radio resources allocation, thus implementing layer L2 functions on a user plane and a control plane. The controller/processor 459 is also responsible for retransmission of a lost packet and a signaling to the first communication device 410. The transmitting processor 468 performs modulation mapping, channel coding, and the multi-antenna transmitting processor 457 performs digital multi-antenna spatial precoding, including codebook-based precoding and non-codebook-based precoding, as well as beamforming. Then the transmitting processor 468 modulates the generated spatial stream into multi-carrier/single-carrier symbol streams, which are provided to different antennas 452 via a transmitter 454 after analog precoding/beamforming operations in the multi-antenna transmitting processor 457. Each transmitter 454 first converts a baseband symbol stream provided by the multi-antenna transmitting processor 457 into a radio-frequency symbol stream, and then provides it to the antenna 452.

In the transmission from the second communication device 450 to the first communication device 410, the function at the first communication device 410 is similar to the receiving function at the second communication device 450 described in the transmission from the first communication device 410 to the second communication device 450. Each receiver 418 receives a radio frequency signal through its corresponding antenna 420, converts the received radio frequency signal into a baseband signal, and provides the baseband signal to a multi-antenna receiving processor 472 and a receiving processor 470. The receiving processor 470 and the multi-antenna receiving processor 472 jointly implement the function of the layer L1. The controller/processor 475 implements functions of layer L2. The controller/processor 475 may be associated with a memory 476 that stores program code and data. The memory 476 may be called a computer readable medium. In the transmission from the second communication device 450 to the first communication device 410, the controller/processor 475 provides demultiplexing, packet reassembling, decryption, header decompression and signal control processing between a transport channel and a logical channel, and recovers a higher layer packet from UE450. A higher-layer data packet from the controller/processor 475 can be provided to the core network;

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using Acknowledgement (ACK) and/or Negative Acknowledgement (NACK) protocols to support HARQ operation.

In one embodiment, the second communication device 450 comprises: at least one processor and at least one memory, the at least one memory comprises computer program codes; the at least one memory and the computer program codes are configured to be used in collaboration with the at least one processor. The second communication device 450 at least receives first information and second information, the second information being used to determine a first time-frequency resource group; judges whether to perform a first channel sensing; when the result of the judging action is no, transmits a first radio signal in the first time-frequency resource group, and when the result of the judging action is yes, performs the first channel sensing to determine whether to transmit a first radio signal in the first time-frequency resource group; when the result of the determining action is yes, transmits the first radio signal in the first time-frequency resource group, and when the result of the determining action is no, drops the transmission of the first radio signal in the first time-frequency resource group. Herein, the first information is used to determine whether the first node and a transmitter of the second information belong to the same serving cell, and the first information is used to judge whether the first channel sensing is performed.

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes receiving first information and second information, the second information being used to determine a first time-frequency resource group; judging whether a first channel sensing is performed; when the result of the judging action is no, transmitting a first radio signal in the first time-frequency resource group; when the result of the judging action is yes, performing the first channel sensing to determine whether to transmit a first radio signal in the first time-frequency resource group; when the result of the determining action is yes, transmitting the first radio signal in the first time-frequency resource group, and when the result of the determining action is no, dropping the transmission of the first radio signal in the first time-frequency resource group. Herein, the first information is used to determine whether the first node and a transmitter of the second information belong to the same serving cell, and the first information is used to judge whether the first channel sensing is performed.

In one subembodiment of the above embodiment, the second communication device 450 corresponds to the first node in the present disclosure.

In one embodiment, the first communication device 410 comprises at least one processor and at least one memory. The at least one memory comprises computer program codes. The at least one memory and the computer program codes are configured to be used in collaboration with the at least one processor. The first communication device 410 device at least transmits first information and second information, the second information being used to determine a first time-frequency resource group; monitors a first radio signal in the first time-frequency resource group; wherein the first information is used to determine whether target receivers of the second node and the second information belong to the same serving cell; the first information is used to judge whether a target receiver of the second information performs a first channel sensing; when the result of the judging action is no, the first radio signal is transmitted in the first time-frequency resource group; when the result of the judging action is yes, the first channel sensing is used to decide whether the first radio signal is transmitted in the first time-frequency resource group.

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes transmitting first information and second information, the second information being used to determine a first time-frequency resource group; monitoring a first radio signal in the first time-frequency resource group; wherein the first information is used to determine whether target receivers of the second node and the second information belong to the same serving cell; the first information is used to judge whether a target receiver of the second information performs a first channel sensing; when the result of the judging action is no, the first radio signal is transmitted in the first time-frequency resource group; when the result of the judging action is yes, the first channel sensing is used to decide whether the first radio signal is transmitted in the first time-frequency resource group.

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the first information and the second information in the present disclosure.

In one embodiment, at least one of the antenna 420, the transmitter 418, the multi-antenna transmitting processor 471, the transmitting processor 416, the controller/processor 475, or the memory 476 is used to transmit the first information and the second information in the present disclosure.

In one embodiment, at least one of the antenna 452, the receiver 454, the multi-antenna receiving processor 458, the receiving processor 456, the controller/processor 459, the memory 460, or the data source 467 is used to determine whether to perform the first channel sensing in the present disclosure.

In one embodiment, at least one of the antenna 452, the receiver 454, the multi-antenna receiving processor 458, the receiving processor 456, the controller/processor 459, the memory 460, or the data source 467 is used to receive the first signaling group in the present disclosure.

In one embodiment, at least one of the antenna 420, the transmitter 418, the multi-antenna transmitting processor 471, the transmitting processor 416, the controller/processor 475, or the memory 476 is used to transmit the first signaling group in the present disclosure.

In one embodiment, at least one of the antenna 452, the receiver 454, the multi-antenna receiving processor 458, the receiving processor 456, the controller/processor 459, the memory 460, or the data source 467 is used to receive the second radio signal in the present disclosure.

In one embodiment, at least one of the antenna 420, the transmitter 418, the multi-antenna transmitting processor 471, the transmitting processor 416, the controller/processor 475, or the memory 476 is used to transmit the second radio signal in the present disclosure.

In one embodiment, at least one of the antenna 452, the receiver 454, the multi-antenna receiving processor 458, the receiving processor 456, the controller/processor 459, the memory 460, or the data source 467 is used to receive the third information in the present disclosure.

In one embodiment, at least one of the antenna 420, the transmitter 418, the multi-antenna transmitting processor 471, the transmitting processor 416, the controller/processor 475, or the memory 476 is used to transmit the third information in the present disclosure.

In one embodiment, at least one of the antenna 452, the transmitter 454, the multi-antenna transmission processor 458, the transmitting processor 468, the controller/processor 459, the memory 460, or the data source 467 is used to transmit the first radio signal in the present disclosure in the first time-frequency resource group in the present disclosure.

In one embodiment, at least one of the antenna 420, the receiver 418, the multi-antenna receiving processor 472, the receiving processor 470, the controller/processor 475, or the memory 476 is used to monitor the first radio signal in the first time-frequency resource group in the present disclosure.

In one embodiment, at least one of the antenna 452, the transmitter 454, the multi-antenna transmitting processor 458, the transmitting processor 468, the controller/processor 459, the memory 460, or the data sources 467 is used to receive the second signaling group in the present disclosure;

In one embodiment, at least one of the antenna 420, the receiver 418, the multi-antenna receiving processor 472, the receiving processor 470, the controller/processor 475, or the memory 476 is used to receive the second signaling group in the present disclosure.

Embodiment 5

Figure 5:
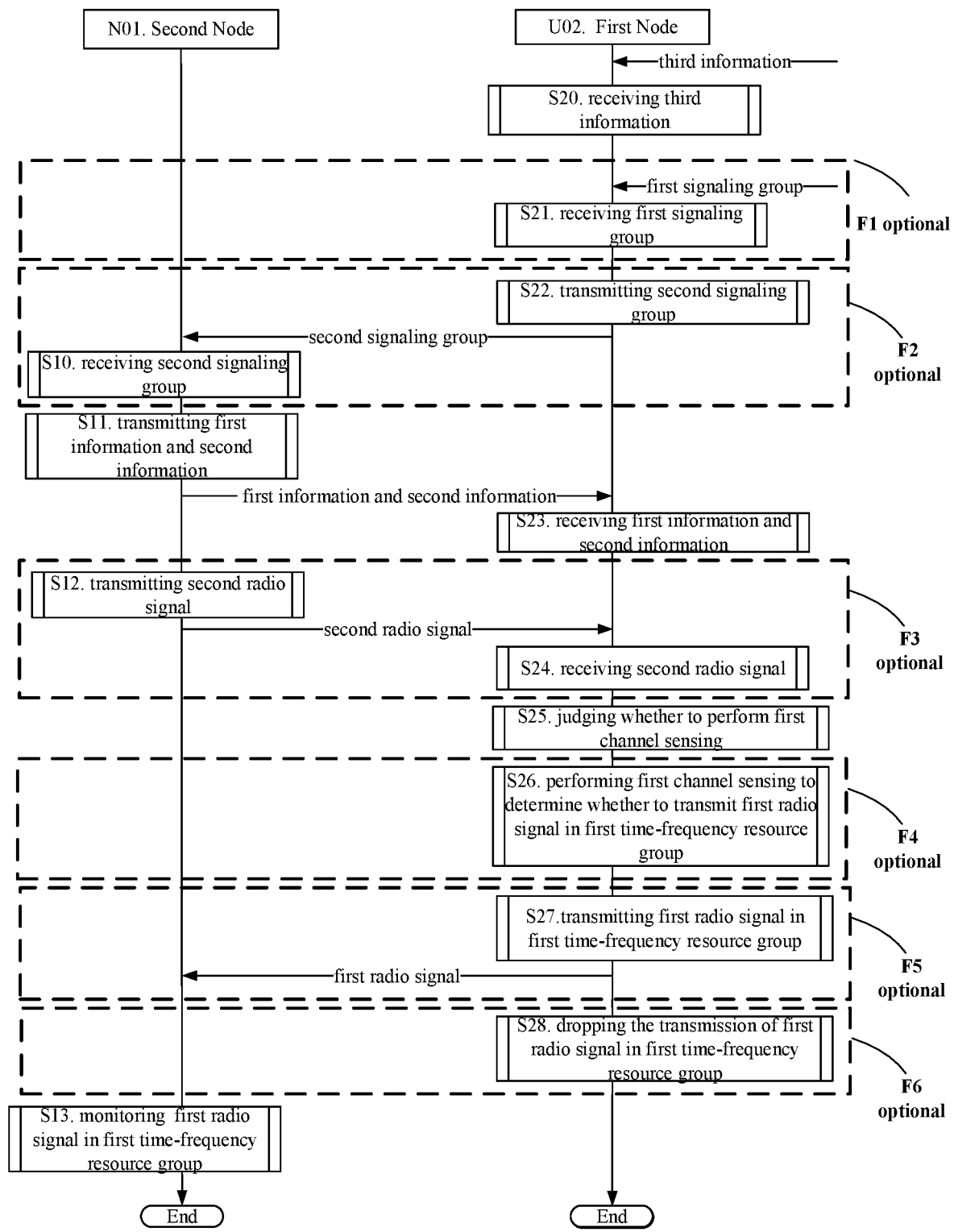
FIG. 5 illustrates a flowchart of radio signal transmission according to one embodiment of the present disclosure.

Embodiment 5 illustrates a radio signal transmission flowchart according to one embodiment in the present disclosure, as shown in FIG. 5. In FIG. 5, a first node U02 and a second node N01 communicate through an air interface. In FIG. 5, steps in dotted blocks F1, F2, F3, F4, F5 and F6 are optional.

The second node N01 receives a second signaling group in step S10; transmits first information and second information in step S11; transmits a second radio signal in step S12; and monitors a first radio signal in a first time-frequency resource group in step S13.

The first node U2 receives third information in step S20; receives a first signaling group in step S21; transmits a second signaling group in step S22; receives first information and second information in step S23; receives a second radio signal in step S24; determines whether a first channel sensing is performed in step S25; performs first channel sensing to determine whether a first radio signal is transmitted in a first time-frequency resource group in step S26; transmits the first radio signal in the first time-frequency resource group in step S27; drops transmitting a first radio signal in a first time-frequency resource group in step S28.

In Embodiment 5, the second information is used by the first node U02 to determine a first time-frequency resource group; when the result of the judging action is no, the first node U02 transmits a first radio signal in the first time-frequency resource group; when the result of the judging action is yes, the first node U02 performs the first channel sensing to determine whether to transmit a first radio signal in the first time frequency resource group; when the result of the determining action is yes, the first node U02 transmits the first radio signal in the first time-frequency resource group, and when the result of the determining action is no, the first node U02 drops the transmission of the first radio signal in the first time-frequency resource group. The first information is used by the first node U02 to determine whether the first node and a transmitter of the second information belong to a same serving cell, and the first information is used to judge whether to perform the first channel sensing. The first signaling group is used to indicate a first time-frequency resource pool; wherein only when the first time-frequency resource group overlaps with the first time-frequency resource pool, the action of judging whether to perform a first channel sensing is performed. The second signaling group is used to indicate a second time-frequency resource pool; wherein only when the first time-frequency resource group overlaps with the second time-frequency resource pool, the action of judging whether to perform a first channel sensing is performed. The second information is used to indicate time-frequency resources occupied by the second radio signal, and the first radio signal is related to the second radio signal. The third information is used to indicate the target threshold.

In one embodiment, when the result of the judging action is no, block F5 exists, and blocks F4 and F6 do not exist.

In one embodiment, when the result of the judging action is yes, block F4 exists, and only one of blocks F5 and F6 exists; the first node U02 performs the first channel sensing to determine whether to transmit a first radio signal in the first time-frequency resource group. When the result of the determining action is yes, block F5 exists, and block F6 does not exist; when the result of the determining action is no, block F6 exists, and block F5 does not exist.

In one embodiment, the first signaling group comprises a positive integer number of signaling(s).

In one embodiment, the first signaling group comprises a signaling.

In one embodiment, the first signaling group comprises a higher-layer signaling.

In one embodiment, the first signaling group comprises an RRC layer signaling.

In one embodiment, the first signaling group comprises a MAC CE signaling.

In one embodiment, the first signaling group comprises a physical-layer signaling.

In one embodiment, the first signaling group comprises a DCI signaling.

In one embodiment, a transmitter of the first signaling group is a UE.

In one embodiment, a transmitter of the first signaling group is a serving cell of the first node.

In one embodiment, a transmitter of the first signaling group is a base station.

In one embodiment, a transmitter of the first signaling group is the third node in the present disclosure.

In one embodiment, the first signaling group is Broadcast.
In one embodiment, the first signaling group is Groupcast.
In one embodiment, the first signaling group is Unicast.

In one embodiment, the first signaling group is Cell-Specific.

In one embodiment, the first signaling group is UE group-specific.

In one embodiment, the first signaling group is UE-specific.

In one embodiment, the first signaling group is transmitted through a Uu interface.

In one embodiment, the first signaling group is transmitted through a PC5 interface.

In one embodiment, the first signaling group is transmitted through a radio signal.

In one embodiment, the first signaling group is transferred from a higher layer of the first node to a physical layer of the first node.

In one embodiment, the first signaling group is transferred inside the first node.

In one embodiment, the first signaling group explicitly indicates a first time-frequency resource pool.

In one embodiment, the first signaling group implicitly indicates a first time-frequency resource pool.

In one embodiment, the first signaling group directly indicates a first time-frequency resource pool.

In one embodiment, the first signaling group indirectly indicates a first time-frequency resource pool.

In one embodiment, the first signaling group comprises a first sub-signaling, which is used to indicate a time-frequency resource pool reserved for a sidelink, and the first time-frequency resource pool comprises a time-frequency resource pool reserved for a sidelink.

In one subembodiment of the above embodiment, the first signaling group is the first subsignaling.

In one subembodiment of the above embodiment, the first signaling group also comprises signaling(s) other than the first sub-signaling.

In one subembodiment of the above embodiment, the first subsignaling is a higher-layer signaling.

In one subembodiment of the above embodiment, the first subsignaling is an RRC signaling.

In one subembodiment of the above embodiment, the first subsignaling is a MAC CE signaling.

In one subembodiment of the above embodiment, the first subsignaling is a physical layer signaling.

In one subembodiment of the above embodiment, the first subsignaling is a DCI signaling.

In one embodiment, the first signaling group comprises a second sub-signaling, which is used to indicate a time-frequency resource pool reserved for contention-based occupation, and the first time-frequency resource pool comprises the time-frequency resource pool reserved for contention-based occupation.

In one subembodiment of the above embodiment, the first signaling group is the second subsignaling.

In one subembodiment of the above embodiment, the first signaling group also comprises signaling(s) other than the second sub-signaling.

In one subembodiment of the above embodiment, the second subsignaling is a higher-layer signaling.

In one subembodiment of the above embodiment, the second subsignaling is an RRC signaling.

In one subembodiment of the above embodiment, the second subsignaling is a MAC CE signaling.

In one subembodiment of the above embodiment, the second subsignaling is a physical layer signaling.

In one subembodiment of the above embodiment, the second subsignaling is a DCI signaling.

In one embodiment, the first signaling group comprises a third subsignaling, which is used to indicate a time-frequency resource pool reserved for grant free, and the first time-frequency resource pool comprises the time-frequency resource pool reserved for grant free.

In one subembodiment of the above embodiment, the first signaling group is the third sub-signaling.

In one subembodiment of the above embodiment, the first signaling group also comprises signaling(s) other than the third subsignaling group.

In one subembodiment of the above embodiment, the third subsignaling is a higher-layer signaling.

In one subembodiment of the above embodiment, the third subsignaling is an RRC signaling.

In one subembodiment of the above embodiment, the third subsignaling is a physical-layer signaling.

In one subembodiment of the above embodiment, the third subsignaling is a DCI signaling.

In one embodiment, the first signaling group comprises a fourth sub-signaling, which is used to indicate a time-frequency resource pool reserved for configured grant, and the first time-frequency resource pool comprises the time-frequency resource pool reserved for configured grant.

In one subembodiment of the above embodiment, the first signaling group is the fourth subsignaling.

In one subembodiment of the above embodiment, the first signaling group also comprises signaling(s) other than the fourth sub-signaling.

In one subembodiment of the above embodiment, the fourth sub-signaling is a higher-layer signaling.

In one subembodiment of the above embodiment, the fourth sub-signaling is an RRC signaling.

In one subembodiment of the above embodiment, the fourth sub-signaling is a MAC CE signaling.

In one subembodiment of the above embodiment, the fourth sub-signaling is a physical-layer signaling.

In one subembodiment of the above embodiment, the fourth sub-signaling is a DCI signaling.

In one embodiment, the first signaling group comprises a fifth sub-signaling, which is used to indicate a time-frequency resource pool reserved for the autonomous uplink (AUL), and the first time-frequency resource pool comprises a time-frequency resource pool reserved for the AUL.

In one subembodiment of the above embodiment, the first signaling group is the fifth subsignaling.

In one subembodiment of the above embodiment, the first signaling group also comprises signaling(s) other than the fifth subsignaling.

In one subembodiment of the above embodiment, the fifth subsignaling is a higher-layer signaling.

In one subembodiment of the above embodiment, the fifth subsignaling is an RRC signaling.

In one subembodiment of the above embodiment, the fifth subsignaling is a MAC CE signaling.

In one subembodiment of the above embodiment, the fifth subsignaling is a physical layer signaling.

In one subembodiment of the above embodiment, the fifth subsignaling is a DCI signaling.

In one embodiment, the second signaling group comprises a positive integer number of signaling(s).

In one embodiment, the second signaling group comprises a signaling.

In one embodiment, the second signaling group comprises a higher-layer signaling.

In one embodiment, the second signaling group comprises an RRC layer signaling.

In one embodiment, the second signaling group comprises a MAC CE signaling.

In one embodiment, the second signaling group comprises a physical-layer signaling.

In one embodiment, the second signaling group comprises a DCI signaling.

In one embodiment, the second signaling group is Broadcast.

In one embodiment, the second signaling group is Groupcast.

In one embodiment, the second signaling group is Unicast.

In one embodiment, the second signaling group is Cell-Specific.

In one embodiment, the second signaling group is UE group-specific.

In one embodiment, the second signaling group is UE-specific.

In one embodiment, the second signaling group is transmitted through a Uu interface.

In one embodiment, the second signaling group is transmitted through a PC5 interface.

In one embodiment, the second signaling group is transmitted through a radio signal.

In one embodiment, a target receiver of the second signaling group comprises a transmitter of the second information.

In one embodiment, a target receiver of the second signaling group comprises the second node in the present disclosure.

In one embodiment, the second time-frequency resource pool is configured by a serving cell of the first node.

In one embodiment, the second signaling group explicitly indicates a second time-frequency resource pool.

In one embodiment, the second signaling group implicitly indicates a second time-frequency resource pool.

In one embodiment, the second signaling group directly indicates a second time-frequency resource pool.

In one embodiment, the second signaling group indirectly indicates a second time-frequency resource pool.

In one embodiment, the second information explicitly indicates time-frequency resources occupied by the second radio signal.

In one embodiment, the second information implicitly indicates time-frequency resources occupied by the second radio signal.

In one embodiment, the second information directly indicates time-frequency resources occupied by the second radio signal.

In one embodiment, the second information indirectly indicates time-frequency resources occupied by the second radio signal.

In one embodiment, the second information indicates an index of the second radio signal.

In one embodiment, the second information indicates an index of the second radio signal, the index of the second radio signal is used by the first node U02 to determine the first time-frequency resource group.

In one embodiment, the second information indicates an index of the second radio signal, the index of the second radio signal indicates configuration information of the second radio signal, and the configuration information of the second radio signal comprises the time-frequency resources occupied by the second radio signal.

In one embodiment, the second radio signal is Unicast.

In one embodiment, the second radio signal is Groupcast.

In one embodiment, the second radio signal is Broadcast.

In one embodiment, the second radio signal is transmitted through a data channel.

In one embodiment, the second radio signal is transmitted through sidelink.

In one embodiment, the second radio signal is transmitted through a radio interface between UEs.

In one embodiment, the second radio signal is transmitted through a radio interface used for communication between the first node and the second node in the present disclosure.

In one embodiment, the second radio signal is transmitted through a radio interface of the sidelink.

In one embodiment, the second radio signal is transmitted through a PC5 interface.

In one embodiment, the second radio signal is transmitted through a Sidelink Shared Channel (SL-SCH).

In one embodiment, the second radio signal is transmitted through a Physical Sidelink Shared Channel (PSSCH).

In one embodiment, the second radio signal comprises SL CSI-RS.

In one embodiment, the second radio signal comprises a transport block (TB).

In one embodiment, the first radio signal carries CSI based on a measurement of the second radio signal.

In one subembodiment of the above embodiment, the CSI comprises at least one of RI, PMI, CQI, RSRP or CRI.

In one embodiment, the first radio signal is used to indicate whether the second radio signal is correctly decoded.

In one embodiment, the first radio signal is used to indicate whether a transmission block comprised in the second radio signal is correctly decoded.

In one embodiment, the first radio signal is used to indicate whether a code block group (CBG) comprised in the second radio signal is correctly decoded.

In one embodiment, the third information explicitly indicates the target threshold.

In one embodiment, the third information implicitly indicates the target threshold.

In one embodiment, the third information directly indicates the target threshold.

In one embodiment, the third information indirectly indicates the target threshold.

In one embodiment, the third information is carried by a higher-layer signaling.

In one embodiment, the third information is carried by a physical-layer signaling.

In one embodiment, the third information is Broadcast.

In one embodiment, the third information is Groupcast.

In one embodiment, the third information is Unicast.

In one embodiment, the third information is Cell-Specific.

In one embodiment, the third information is UE group-specific.

In one embodiment, the third information is UE-specific.

In one embodiment, the third information is transmitted through sidelink.

In one embodiment, the third information is transmitted through a Physical Sidelink Broadcast Channel (PSBCH).

In one embodiment, the third information is transmitted through a SideLink Discovery Channel (SL-DCH).

In one embodiment, the third information is transmitted through a Physical Sidelink Discovery Channel (PSDCH).

In one embodiment, the third information is transmitted through a Sidelink Shared Channel (SL-SCH).

In one embodiment, the third information is transmitted through a Physical Sidelink Shared Channel (PSSCH).

In one embodiment, the third information is transmitted through a Physical Sidelink Control Channel (PSCCH).

In one embodiment, the third information comprises all or part of Fields of a Sidelink Control Information (SCI) signaling.

In one embodiment, the third information comprises one or more Fields of a Master Information Block (MIB).

In one embodiment, the third information comprises one or more Fields of a System Information Block (SIB).

In one embodiment, the third information comprises one or more Fields of Remaining System Information (RMSI).

In one embodiment, the third information comprises all or part of Fields of an Information Element (IE) in a Radio Resource Control (RRC) signaling.

In one embodiment, the third information is carried by a MAC CE signaling.

In one embodiment, the third information is transmitted through a Downlink Shared Channel (DL-SCH).

In one embodiment, the third information is transmitted through a Physical Downlink Shared Channel (PDSCH).

In one embodiment, the third information is transmitted through a Physical Downlink Control Channel (PDCCH).

In one embodiment, the third information comprises all or part of Fields of a Downlink Control Information (DCI) signaling.

In one embodiment, the third information is transmitted through a radio interface of the sidelink.

In one embodiment, the third information is transmitted through a radio interface between UEs.

In one embodiment, the third information is transmitted through a radio interface between a UE and a base station.

In one embodiment, the third information is transmitted through a Uu interface.

In one embodiment, the third information is transmitted through a PC5 interface.

In one embodiment, the third information is transmitted through a radio signal.

In one embodiment, a transmitter of the third information is a UE.

In one embodiment, the third information is transmitted from a base station to the first node.

In one embodiment, the third information is transmitted from a serving cell of the first node to the first node.

In one embodiment, the third information is transmitted from the third node in the present disclosure to the first node.

In one embodiment, the third information is transmitted from the transmitter of the second information in the present disclosure to the first node.

In one embodiment, the third information is transferred from a higher layer of the first node to a physical layer of the first node.

In one embodiment, the third information is transferred inside the first node.

In one embodiment, the first information is used to judge whether a target receiver of the second information performs a first channel sensing; when the first radio signal is transmitted in the first time-frequency resource group, and the target receiver of the second information is a transmitter of the first radio signal.

In one embodiment, the phrase that monitors a first radio signal in the first time-frequency resource group comprises: sensing energy of radio signals in the first time-frequency resource group and averaging it to obtain average received energy.

In one subembodiment of the above embodiment, when the average received energy is greater than a first given threshold, it is judged that the first radio signal is detected.

In one subembodiment of the above embodiment, when the average received energy is less than a first given threshold, it is judged that the first radio signal is not detected.

In one subembodiment of the above embodiment, when the average received energy is equal to a first given threshold, the first radio signal is judged to be detected.

In one subembodiment of the above embodiment, when the average receiving energy is equal to a first given threshold, it is judged that the first radio signal is not detected.

In one subembodiment of the above described embodiment, the first given threshold is predefined or configurable.

In one embodiment, the phrase that monitors a first radio signal in the first time-frequency resource group comprises: sensing power of radio signals in the first time-frequency resource group and averaging it to obtain average received power.

In one subembodiment of the above embodiment, when the average received power is greater than a second given threshold, it is judged that the first radio signal is detected.

In one subembodiment of the above embodiment, when the average receiving power is less than a second given threshold, it is judged that the first radio signal is not detected.

In one subembodiment of the above embodiment, when the average receiving power is equal to a second given threshold, the first radio signal is judged to be detected.

In one subembodiment of the above embodiment, when the average receiving power is equal to a second given threshold, it is judged that the first radio signal is not detected.

In one subembodiment of the above embodiment, the second given threshold is predefined or configurable.

In one embodiment, the phrase that monitors a first radio signal in the first time-frequency resource group comprises: performing coherent receptions in the first time-frequency resource group and measuring an average energy of signals obtained after the coherent receptions.

In one sub-embodiment of the above embodiment, when the average energy of signals obtained after the coherent receptions is greater than a third given threshold, it is judged that the first radio signal is detected.

In one subembodiment of the above embodiment, when the average energy of signals obtained after the coherent receptions is less than a third given threshold, it is judged that the first radio signal is not detected.

In one subembodiment of the above embodiment, when the average energy of signals obtained after the coherent receptions is equal to a third given threshold, it is judged that the first radio signal is detected.

In one subembodiment of the above embodiment, when the average energy of signals obtained after the coherent receptions is equal to a third given threshold, it is judged that the first radio signal is not detected.

In one subembodiment of the above described embodiment, the third given threshold is predefined or configurable.

In one embodiment, the phrase that monitors a first radio signal in the first time-frequency resource group comprises: performing coherent reception in the first time-frequency resource group and measuring an average power of signals after the coherent reception.

In one subembodiment of the above embodiment, when the average power of the signal obtained after the coherent receptions is greater than a fourth predetermined threshold, it is judged that the first radio signal is detected.

In one subembodiment of the above embodiment, when the average power of the signal obtained after the coherent receptions is less than a fourth predetermined threshold, it is judged that the first radio signal is not detected.

In one subembodiment of the above embodiment, when the average power of the signal obtained after the coherent receptions is equal to a fourth given threshold, it is judged that the first radio signal is detected.

In one subembodiment of the above embodiment, when the average power of the signal obtained after the coherent receptions is equal to a fourth given threshold, it is judged that the first radio signal is not detected.

In one subembodiment of the above described embodiment, the fourth given threshold is predefined or configurable.

In one embodiment, the phrase that monitors a first radio signal in the first time-frequency resource group comprises: performing blind detection in the first time-frequency resource group, that is, receiving signals in the first time-frequency resource group and performing decoding operation; when it is determined that the decoding is correct according to a Cyclic Redundancy Check (CRC) bit, it is judged that the first radio signal is detected, otherwise it is judged that the first radio signal is not detected.

In one embodiment, the second node further comprises:
receiving a first signaling group, the first signaling group is used to indicate a first time-frequency resource pool;
wherein only when the first time-frequency resource group overlaps with the first time-frequency resource pool, the monitoring of the first radio signal in the first time-frequency resource group is performed.

In one subembodiment of the above embodiment, when the first time-frequency resource group does not overlap with the first time-frequency resource pool, the second node N01 drops monitoring the first radio signal in the first time-frequency resource group.

In one embodiment, only when the first time-frequency resource group overlaps with the second time-frequency resource pool, the second node N01 monitors the first radio signal in the first time-frequency resource group.

In one embodiment, when the first time-frequency resource group does not overlap with the second time-frequency resource pool, the second node N01 drops the monitoring of the first radio signal in the first time-frequency resource group.

Embodiment 6

Figure 6:
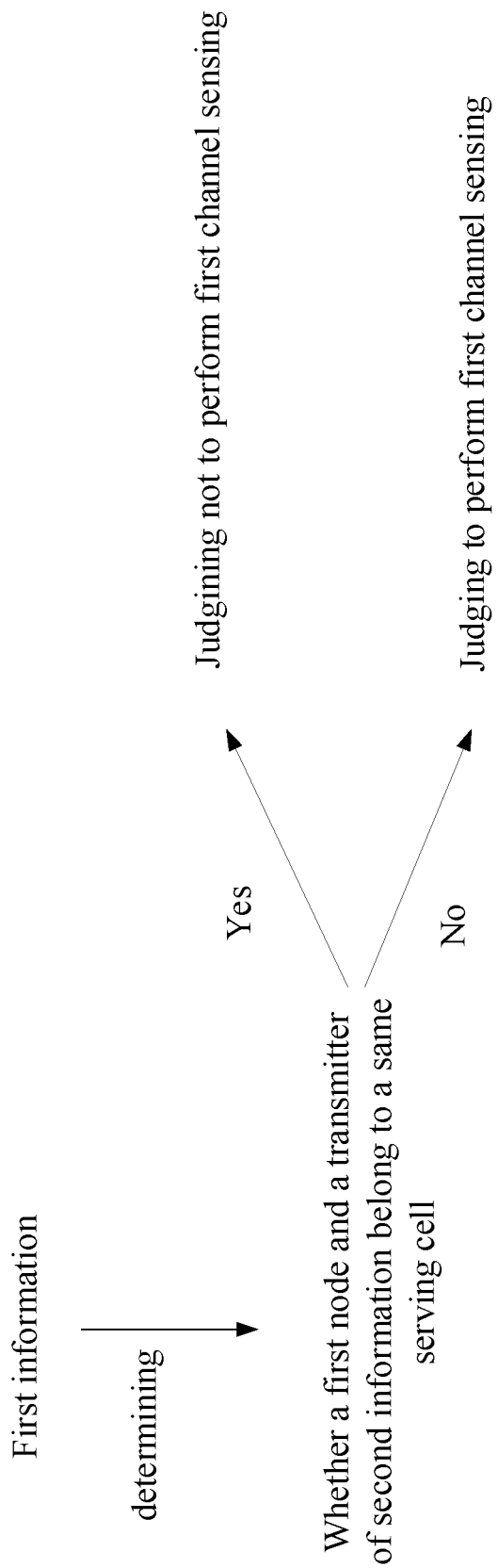
FIG. 6 illustrates a schematic diagram of first information being used to determine whether to perform a first channel sensing according to one embodiment of the present disclosure.

Embodiment 6 illustrates a schematic diagram in which first information is used to judge whether to perform a first channel sensing according to one embodiment of the present disclosure, as shown in FIG. 6.

In Embodiment 6, the first information is used to determine whether the first node and a transmitter of the second information in the present disclosure belong to a same serving cell; when the first node and the transmitter of the second information belong to a same serving cell, it is judged that the first channel sensing is not performed; when the first node and the transmitter of the second information do not belong to a same serving cell, it is judged that the first channel sensing is performed.

In one embodiment, the phrase that the first node and the transmitter of the second information do not belong to a same serving cell comprises: the first node and the transmitter of the second information reside in two different serving cells respectively.

In one embodiment, the phrase that the first node and a transmitter of the second information do not belong to a same serving cell comprises: the first node and a transmitter of the second information are respectively located within the cell's coverage and out of the cell's coverage.

In one embodiment, the phrase that the first node and the transmitter of the second information belong to a same serving cell comprises: the first node and the transmitter of the second information reside in a same serving cell.

In one embodiment, the phrase that the first node and the transmitter of the second information belong to a same serving cell comprises: the first node and the transmitter of the second information are both located within the cell's coverage.

In one embodiment, the phrase that the first node and the transmitter of the second information belong to a same serving cell comprises: the first node and the transmitter of the second information are both located outside the cell's coverage.

Embodiment 7

Figure 7:
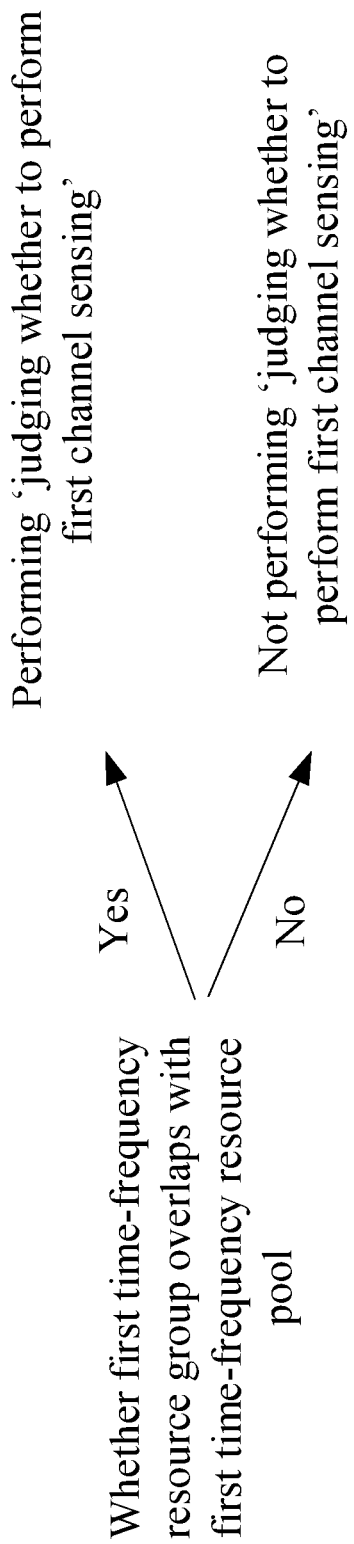
FIG. 7 illustrates a schematic diagram of conditions for judging whether a first channel sensing is performed according to one embodiment of the present disclosure.

Embodiment 7 is a schematic diagram for conditions for judging whether a first channel sensing is performed according to one embodiment of the present disclosure, as shown in FIG. 7.

In Embodiment 7, only when the first time-frequency resource group overlaps with the first time-frequency resource pool in the present disclosure, the action of judging whether to perform a first channel sensing is performed.

In one embodiment, the first time-frequency resource pool comprises a positive integer number of Resource Elements (REs).

In one embodiment, the first time-frequency resource pool comprises a positive integer number of multi-carrier symbol(s) in time domain.

In one embodiment, the first time-frequency resource pool comprises a positive integer number of slot(s) in time domain.

In one embodiment, the first time-frequency resource pool comprises a positive integer number of sub-frame(s) in time domain.

In one embodiment, the first time-frequency resource pool comprises a positive integer number of sub-carrier(s) in frequency domain.

In one embodiment, the first time-frequency resource pool comprises a positive integer number of Physical resource block(s) (PRB) in frequency domain.

In one embodiment, the first time-frequency resource pool comprises a positive integer number of sub-channel(s) in frequency domain.

In one embodiment, the first time-frequency resource pool comprises time-frequency resources allocated to a Physical Sidelink Feedback Channel (PSFCH).

In one embodiment, the first time-frequency resource pool comprises time-frequency resources allocated to a PSCCH.

In one embodiment, the first time-frequency resource pool comprises time-frequency resources allocated to a PSSCH.

In one embodiment, the first time-frequency resource pool comprises resources allocated to sublink transmission.

In one embodiment, when the first time-frequency resource group do not overlap the first time-frequency resource pool, the action of judging whether to perform a first channel sensing is not performed.

In one embodiment, when the first time-frequency resource group does not overlap with the first time-frequency resource pool, the transmission of the first radio signal in the first time-frequency resource group is dropped.

In one embodiment, when the first time-frequency resource group does not overlap with the first time-frequency resource pool, the first radio signal is transmitted in the first time-frequency resource group.

In one embodiment, the phrase that the first time-frequency resource group overlaps with the first time-frequency resource pool comprises: any of resource elements (REs) in the first time-frequency resource group belongs to the first time-frequency resource pool.

In one embodiment, the phrase that the first time-frequency resource group overlaps with the first time-frequency resource pool comprises: at least one RE belongs to the first time-frequency resource group and the first time-frequency resource pool at the same time.

In one embodiment, the phrase that the first time-frequency resource group overlaps with the first time-frequency resource pool comprises: the first time-frequency resource group and the first time-frequency resource pool are the same.

In one embodiment, the phrase that the first time-frequency resource group does not overlap with the first time-frequency resource pool comprises: any of REs in the first time-frequency resource group does not belong to the first time-frequency resource pool.

In one embodiment, the phrase that the first time-frequency resource group does not overlap with the first time-frequency resource pool comprises: at least one RE in the first time-frequency resource group does not belong to the first time-frequency resource pool.

In one embodiment, the phrase that the first time-frequency resource group overlaps with the first time-frequency resource pool comprises: the first time-frequency resource group and the first time-frequency resource pool are different.

Embodiment 8

Figure 8:
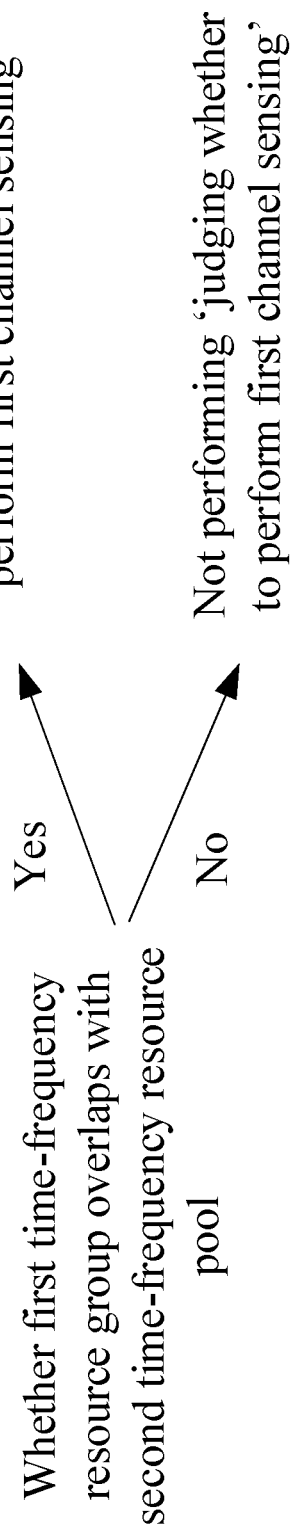
FIG. 8 illustrates a schematic diagram of conditions for judging whether a first channel sensing is performed according to another embodiment of the present disclosure.

Embodiment 8 is a schematic diagram for conditions for judging whether a first channel sensing is performed according to another embodiment of the present disclosure, as shown in FIG. 8.

In Embodiment 8, only when the first time-frequency resource group overlaps with the second time-frequency resource pool in the present disclosure, the action of judging whether to perform a first channel sensing is performed.

In one embodiment, when the first time-frequency resource group does not overlap with the second time-frequency resource pool, the transmission of the first radio signal in the first time-frequency resource group is dropped.

In one embodiment, when the first time-frequency resource group does not overlap with the second time-frequency resource pool, the action of judging whether to perform a first channel sensing is not performed.

In one embodiment, the second time-frequency resource pool comprises a positive integer number of Resource Element(s) (RE).

In one embodiment, the second time-frequency resource pool comprises a positive integer number of multi-carrier symbol(s) in time domain.

In one embodiment, the second time-frequency resource pool comprises a positive integer number of slot(s) in time domain.

In one embodiment, the second time-frequency resource pool comprises a positive integer number of sub-frame(s) in time domain.

In one embodiment, the second time-frequency resource pool comprises a positive integer number of sub-carrier(s) in frequency domain.

In one embodiment, the second time-frequency resource pool comprises a positive integer number of Physical resource block(s) (PRB) in frequency domain.

In one embodiment, the second time-frequency resource pool comprises a positive integer number of sub-channel(s) in frequency domain.

In one embodiment, the second time-frequency resource pool comprises time-frequency resources allocated to a Physical Sidelink Feedback Channel (PSFCH).

In one embodiment, the second time-frequency resource pool comprises time-frequency resources allocated to a PSCCH.

In one embodiment, the second time-frequency resource pool comprises time-frequency resources allocated to a PSSCH.

In one embodiment, the second time-frequency resource pool comprises resources allocated to sublink transmission.

In one embodiment, the phrase that the first time-frequency resource group overlaps with the second time-frequency resource pool comprises: any of resource elements (REs) in the first time-frequency resource group belongs to the second time-frequency resource pool.

In one embodiment, the phrase that the first time-frequency resource group overlaps with the second time-frequency resource pool comprises: at least one RE belongs to both the first time-frequency resource group and the second time-frequency resource pool at the same time.

In one embodiment, the phrase that the first time-frequency resource group overlaps with the second time-frequency resource pool comprises: the first time-frequency resource group and the second time-frequency resource pool are the same.

In one embodiment, the phrase that the first time-frequency resource group does not overlap with the second time-frequency resource pool comprises: any of resource elements (REs) in the first time-frequency resource group does not belong to the second time-frequency resource pool.

In one embodiment, the phrase that the first time-frequency resource group does not overlap with the second time-frequency resource pool comprises: at least one RE in the first time-frequency resource group does not belong to the second time-frequency resource pool.

In one embodiment, the phrase that the first time-frequency resource group overlaps with the second time-frequency resource pool comprises: the first time-frequency resource group and the second time-frequency resource pool are different.

Embodiment 9

Figure 9:
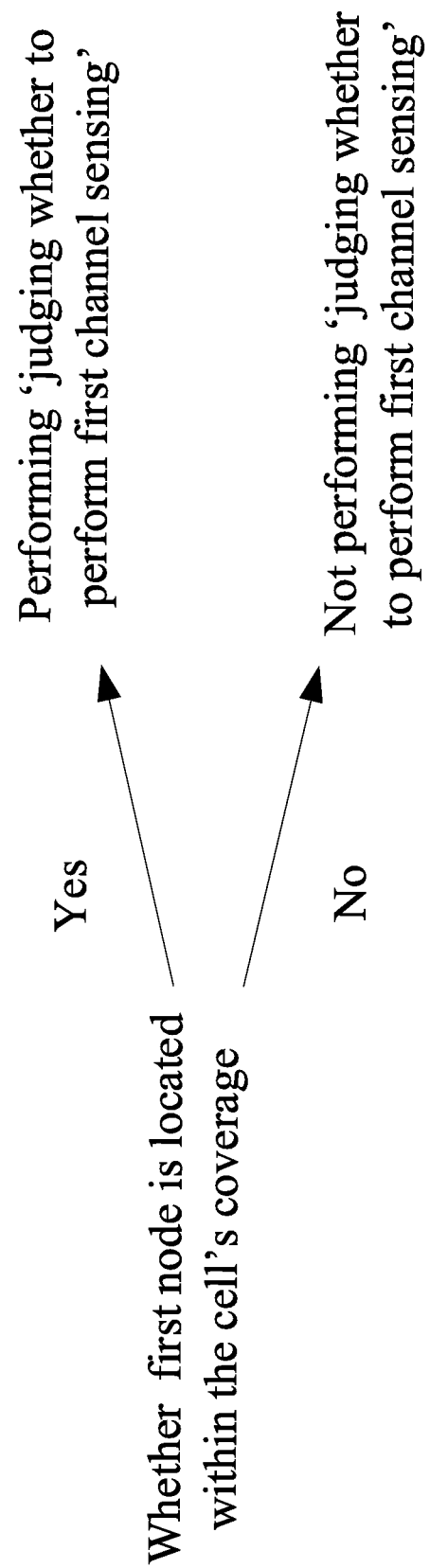
FIG. 9 illustrates a schematic diagram of conditions for judging whether a first channel sensing is performed according to another embodiment of the present disclosure.

Embodiment 9 is a schematic diagram for determining whether to perform first channel sensing executed conditions according to another embodiment of the present disclosure, as shown in FIG. 9.

In Embodiment 9, only when the first node in the present disclosure is located within the cell's coverage, the action of judging whether to perform a first channel sensing is performed.

In one embodiment, only when the first node is located outside the cell's coverage, the action of judging whether to perform a first channel sensing is not performed.

In one embodiment, when the first node is located outside the cell's coverage, the first radio signal is transmitted in the first time-frequency resource group.

In one embodiment, the method in a first node used for wireless communication comprises:

transmitting a first target signaling;

wherein, the first target signaling is used to indicate whether it is located within the cell's coverage.

In one subembodiment of the above embodiment, the first target signaling explicitly indicates whether the first node is located within the cell's coverage.

In one subembodiment of the above embodiment, the first target signaling implicitly indicates whether the first node is located within the cell's coverage.

In one subembodiment of the above embodiment, the first target signaling directly indicates whether the first node is located within the cell's coverage.

In one subembodiment of the above embodiment, the first target signaling indirectly indicates whether the first node is located within the cell's coverage.

In one subembodiment of the above embodiment, the first target signaling is a Master Information Block (MIB).

In one subembodiment of the above embodiment, the first target signaling is Broadcast.

In one subembodiment of the above embodiment, the first target signaling is Groupcast.

In one subembodiment of the above embodiment, the first target signaling is a physical layer signaling.

In one subembodiment of the above embodiment, the first target signaling is a Sidelink Control Indicator (SCI).

In one subembodiment of the above embodiment, only when the first target signaling is used to indicate that it is located within the cell's coverage, the action of judging whether to perform a first channel sensing is performed.

In one subembodiment of the above embodiment, only when the first target signaling is used to indicate that it is located outside the cell's coverage, the action of judging whether to perform a first channel sensing is not performed.

In one subembodiment of the above embodiment, when the first target signaling is used to indicate that it is located outside the cell's coverage, the first radio signal is transmitted in the first time-frequency resource group.

In one embodiment, the method in the first node used for wireless communication comprises:

receiving a downlink reference signal;

wherein when a receiving power of the downlink reference signal exceeds the first threshold, it is determined that it is located within the cell's coverage, or when a receiving power of the downlink reference signal is less than the first threshold, it is determined to be located outside the cell's coverage.

In one subembodiment of the above embodiment, when a receiving power of the downlink reference signal is equal to the first threshold, it is determined that it is located within the cell's coverage.

In one subembodiment of the above embodiment, when a receiving power of the downlink reference signal is equal to the first threshold, it is determined that it is located outside the cell's coverage.

In one subembodiment of the above embodiment, the first threshold is a positive real number.

In one subembodiment of the above embodiment, the first threshold is a positive integer.

In one subembodiment of the above embodiment, the first threshold is measured by dBm.

In one subembodiment of the above embodiment, a transmitter of the downlink reference signal is a serving cell of the first node.

In one subembodiment of the above embodiment, a transmitter of the downlink reference signal is a base station.

In one subembodiment of the above embodiment, a transmitter of the downlink reference signal is the third node in the present disclosure.

In one embodiment, the method in a first node used for wireless communication comprises:

receiving an information bit block on a first downlink channel;

wherein when a Block Error Rate (BLER) of the information bit block is less than a second threshold, it is determined that it is located within the cell's coverage; when the BLER of the information bit block is greater than a second threshold, it is determined to be located outside the cell's coverage, the second threshold being a positive real number less than 1.

In one subembodiment of the above embodiment, when BLER of the information bit block is equal to a second threshold, it is determined that it is located within the cell's coverage.

In one subembodiment of the above embodiment, when the BLER of the information bit block is equal to a second threshold, it is determined to be located outside the cell's coverage.

In one subembodiment of the above embodiment, the first downlink channel is a Physical Broadcasting Channel (PBCH).

In one embodiment, the first downlink channel is a Physical Downlink Control Channel (PDCCH).

In one subembodiment of the above embodiment, the second threshold is measured by dBm.

In one subembodiment of the above embodiment, a transmitter of the information bit block is a serving cell of the first node.

In one subembodiment of the above embodiment, a transmitter of the information bit block is a base station.

In one subembodiment of the above embodiment, a transmitter of the information bit block is the third node in the present disclosure.

Embodiment 10

Figure 10:
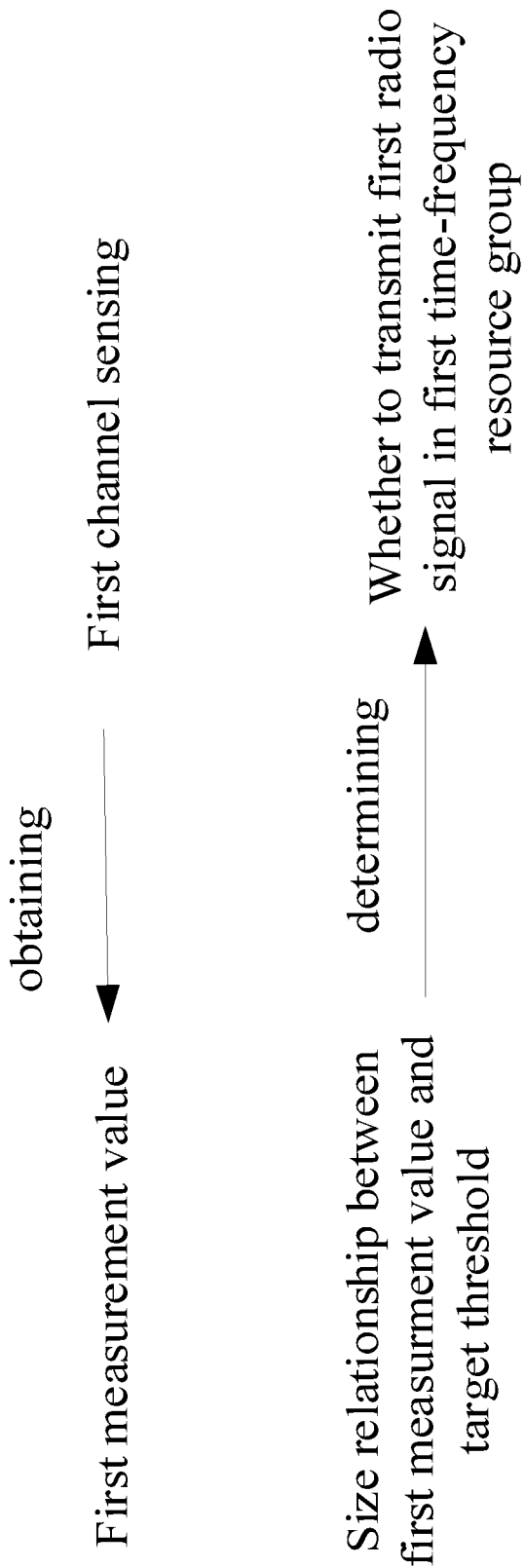
FIG. 10 illustrates a schematic diagram of a first channel sensing according to one embodiment of the present disclosure.

Embodiment 10 illustrates a schematic diagram of a first channel sensing according to one embodiment of the present disclosure, as shown in FIG. 10.

In Embodiment 10, the first channel sensing is performed in the reference time frequency resource group, frequency-domain resources occupied by the reference time-frequency resource group are related to frequency-domain resources occupied by the first time-frequency resource group in the present disclosure. The first channel sensing is used to obtain a first measurement value, and the size relationship between the first measurement value and a target threshold is used to determine whether to transmit the first radio signal in the present disclosure in the first time-frequency resource group.

In one embodiment, the reference time-frequency resource group comprises a positive integer number of Resource Element(s) (RE).

In one embodiment, the reference time-frequency resource group comprises a positive integer number of multi-carrier symbol(s) in time domain.

In one embodiment, the reference time-frequency resource group comprises a positive integer number of slot(s) in time domain.

In one embodiment, the reference time-frequency resource group comprises a positive integer number of sub-frame(s) in time domain.

In one embodiment, the reference time-frequency resource group comprises a positive integer number of sub-carrier(s) in frequency domain.

In one embodiment, the reference time-frequency resource group comprises a positive integer number of Physical resource block(s) (PRB) in frequency domain.

In one embodiment, the reference time-frequency resource group comprises a positive integer number of sub-channel(s) in frequency domain.

In one embodiment, the reference time-frequency resource group belongs to a sensing window in time domain.

In one embodiment, the reference time-frequency resource group is used for PSFCH transmission.

In one embodiment, the reference time-frequency resource group is used for PSCCH transmission.

In one embodiment, the reference time-frequency resource group is used for PSSCH transmission.

In one embodiment, the first channel sensing comprises a sensing.

In one embodiment, the first channel sensing performed in the reference time-frequency resource group comprises: sensing energy of radio signals in the reference time-frequency resource group and averaging to obtain an average received energy.

In one embodiment, the first channel sensing performed in the reference time-frequency resource group comprises: sensing power of radio signals in the reference time-frequency resource group and averaging to obtain an average received power.

In one embodiment, the first channel sensing performed in the reference time-frequency resource group comprises: performing coherent receptions in the reference time-frequency resource group, and measuring the average energy of signals obtained after the coherent reception.

In one embodiment, the first channel sensing performed in the reference time-frequency resource group comprises: performing coherent receptions in the reference time-frequency resource group, and measuring the average power of signals obtained after the coherent reception.

In one embodiment, the first channel sensing performed in the reference time-frequency resource group comprises: receiving a first reference signal in the reference time-frequency resource group, and measuring the average received power of the first reference signal.

In one embodiment, the first channel sensing performed in the reference time-frequency resource group comprises: performing coherent receptions of the first reference signal in the reference time-frequency resource group, and measuring the average received power of signals after coherent reception.

In one embodiment, the first reference signal is transmitted in the reference time-frequency resource group; the measurement for the first reference signal is used to generate the first measurement value.

In one subembodiment of the above embodiment, the first measurement value comprises RSRP of the first reference signal.

In one subembodiment of the above embodiment, the first measurement value comprises RSRQ of the first reference signal.

In one subembodiment of the above embodiment, the first measurement value comprises RSSI of the first reference signal.

In one embodiment, the first reference signal comprises a SideLink (SL) Reference Signal (RS).

In one embodiment, the first reference signal comprises a Channel-State Information Reference Signal (CSI-RS).

In one embodiment, the first reference signal comprises a SL CSI-RS.

In one embodiment, the first reference signal comprises a Sounding Reference Signal (SRS).

In one embodiment, the first reference signal comprises a SL SRS.

In one embodiment, the first reference signal comprises a DeModulation Reference Signal (DMRS).

In one embodiment, the first reference signal comprises a SL DMRS.

In one embodiment, the first reference signal is transmitted through a PC5 interface.

In one embodiment, the first reference signal occupies only part of REs in the reference time-frequency resource group.

In one embodiment, the first reference signal occupies all REs in the reference time-frequency resource group.

In one embodiment, the first reference signal comprises a PSCCH DMRS.

In one embodiment, the first reference signal comprises a PSSCH DMRS.

In one embodiment, the first measurement value comprises Reference Signal Received Power (RSRP).

In one embodiment, the first measurement value comprises layer 1 (L1) RSRP.

In one embodiment, the first measurement value comprises Reference Signal Received Quality (RSRQ).

In one subembodiment, the first information comprises a Channel Quality Indicator (CQI).

In one embodiment, the first measurement value comprises a Received Signal Strength Indicator (RSSI).

In one embodiment, the first measurement value is measured by dBm.

In one embodiment, the unit of the first measurement value is measured by dB.

In one embodiment, the frequency domain resources occupied by the reference time-frequency resource group comprise frequency domain resources occupied by the first time-frequency resource group.

In one embodiment, according to frequency-domain resources occupied by the first time-frequency resource group, frequency-domain resources occupied by the reference time-frequency resource group can be inferred.

In one embodiment, time-domain resources occupied by the reference time-frequency resource group are earlier than time-domain resources occupied by the first time-frequency resource group.

In one embodiment, time-domain resources occupied by the reference time-frequency resource group are related to time-domain resources occupied by the first time-frequency resource group.

In one embodiment, according to time-domain resources occupied by the first time-frequency resource group, time-domain resources occupied by the reference time-frequency resource group can be inferred.

In one embodiment, when the first measurement value is greater than the target threshold, the transmission of the first radio signal is dropped in the first time-frequency resource group.

In one embodiment, when the first measurement value is less than the target threshold, the first radio signal is transmitted in the first time-frequency resource group.

In one embodiment, when the first measurement value is equal to the target threshold, the transmission of the first radio signal is dropped in the first time-frequency resource group.

In one embodiment, when the first measurement value is equal to the target threshold, the first radio signal is transmitted in the first time-frequency resource group.

In one embodiment, the target threshold is predefined.

In one embodiment, the target threshold is configurable.

In one embodiment, a unit of the target threshold is watts.

In one embodiment, a unit of the target threshold is dBm.

In one embodiment, a unit of the target threshold is dB.

In one embodiment, the target threshold is related to a value of Prose Per-Packet Priority (PPPP).

In one embodiment, the target threshold is related to a value of Prose Per-Packet Reliability (PPPR).

In one embodiment, the target threshold is related to a QoS level.

In one embodiment, the target threshold is related to a 5G QoS Indicator (5QI).

In one embodiment, the target threshold is related to a PC5 QoS Indicator (PQI).

Embodiment 11

Figure 11:
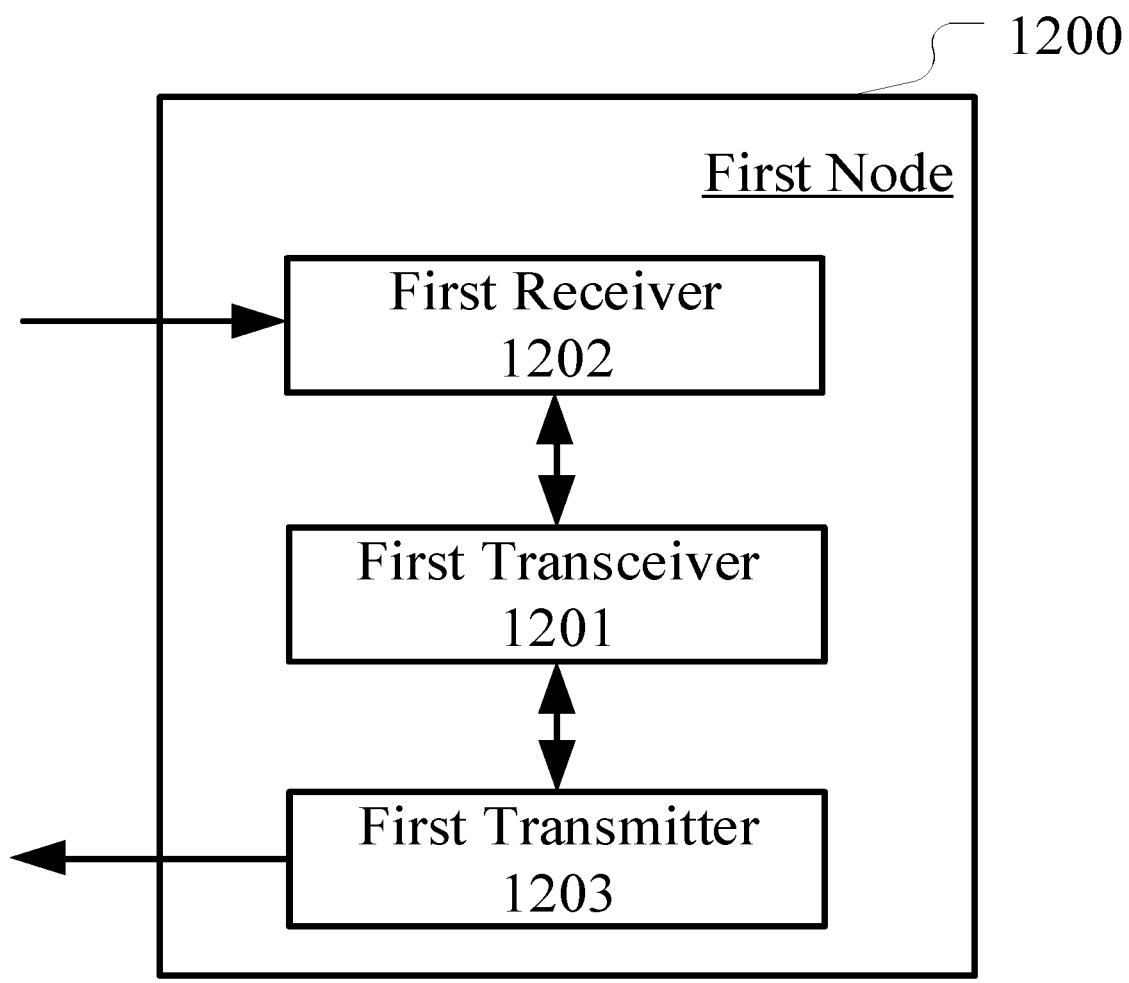
FIG. 11 illustrates a structure block diagram of a processing device in a first node according to one embodiment of the present disclosure.

Embodiment 11 illustrates a structural block diagram of a processing device in a first node, as shown in FIG. 11. In FIG. 11, a first node processing device 1200 comprises a first transceiver 1201, a first receiver 1202 and a first transmitter 1203, wherein the first transmitter 1203 is optional.

In one embodiment, the first node 1200 is a UE.

In one embodiment, the first node 1200 is a relay node.

In one embodiment, the first node 1200 is a base station.

In one embodiment, the first node 1200 is a vehicle-mounted communication device.

In one embodiment, the first node 1200 is a UE supporting V2X communications.

In one embodiment, the first node 1200 is a relay node supporting V2X communications.

In one embodiment, the first transceiver 1201 comprises at least one of an antenna 452, a transmitter/receiver 454, a multi-antenna transmitting processor 457, a multi-antenna receiving processor 458, a transmitting processor 468, a receiving processor 456, a controller/processor 459, a memory 460 or a data source 467 in FIG. 4 of the present disclosure.

In one embodiment, the first transceiver 1201 comprises at least the first seven of an antenna 452, a transmitter/receiver 454, a multi-antenna transmitting processor 457, a multi-antenna receiving processor 458, a transmitting processor 468, a receiving processor 456, a controller/processor 459, a memory 460 or a data source 467 in FIG. 4 of the present disclosure.

In one embodiment, the first transceiver 1201 comprises at least the first six of an antenna 452, a transmitter/receiver 454, a multi-antenna transmitting processor 457, a multi-antenna receiving processor 458, a transmitting processor 468, a receiving processor 456, a controller/processor 459, a memory 460 or a data source 467 in FIG. 4 of the present disclosure.

In one embodiment, the first transceiver 1201 comprises at least the first four of an antenna 452, a transmitter/receiver 454, a multi-antenna transmitting processor 457, a multi-antenna receiving processor 458, a transmitting processor 468, a receiving processor 456, a controller/processor 459, a memory 460 or a data source 467 in FIG. 4 of the present disclosure.

In one embodiment, the first transceiver 1201 comprises at least the first two of an antenna 452, a transmitter/receiver 454, a multi-antenna transmitting processor 457, a multi-antenna receiving processor 458, a transmitting processor 468, a receiving processor 456, a controller/processor 459, a memory 460 or a data source 467 in FIG. 4 of the present disclosure.

In one embodiment, the first receiver 1202 comprises at least one of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first five of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first four of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first three of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first two of an antenna 452, a receiver 454, a multi-antenna receiving processor 458, a receiving processor 456, a controller/processor 459, a memory 460 or a data source 467 in FIG. 4 of the present disclosure.

In one embodiment, the first transmitter 1203 comprises at least one of an antenna 452, a transmitter 454, a multi-antenna transmitting processor 457, a transmitting processor 468, a controller/processor 459, a memory 460, or a data source 467 in FIG. 4 of the present disclosure.

In one embodiment, the first transmitter 1203 comprises at least the first five of an antenna 452, a transmitter 454, a multi-antenna transmitting processor 457, a transmitting processor 468, a controller/processor 459, a memory 460, or a data source 467 in FIG. 4 of the present disclosure.

In one embodiment, the first transmitter 1203 comprises at least the first four of an antenna 452, a transmitter 454, a multi-antenna transmitting processor 457, a transmitting processor 468, a controller/processor 459, a memory 460, or a data source 467 in FIG. 4 of the present disclosure.

In one embodiment, the first transmitter 1203 comprises at least the first three of an antenna 452, a transmitter 454, a multi-antenna transmitting processor 457, a transmitting processor 468, a controller/processor 459, a memory 460, or a data source 467 in FIG. 4 of the present disclosure.

In one embodiment, the first transmitter 1203 comprises at least the first two of an antenna 452, a transmitter 454, a multi-antenna transmitting processor 457, a transmitting processor 468, a controller/processor 459, a memory 460, or a data source 467 in FIG. 4 of the present disclosure.

A first receiver 1202 receives first information and second information, the second information being used to determine a first time-frequency resource group.

A first transceiver 1201 judges whether a first channel sensing is performed; when the result of the judging action is no, transmits a first radio signal in the first time-frequency resource group; when the result of the judging action is yes, performs the first channel sensing to determine whether to transmit a first radio signal in the first time-frequency resource group; when the result of the determining action is yes, transmits the first radio signal in the first time-frequency resource group; when the result of the determining action is no, drops the transmission of the first radio signal in the first time-frequency resource group.

In Embodiment 11, the first information is used to determine whether the first node and a transmitter of the second information belong to a same serving cell, and the first information is used to judge whether to perform the first channel sensing.

In one embodiment, when the first node and a transmitter of the second information belong to a same serving cell, it is judged not to perform the first channel sensing; when the first node and the transmitter of the second information do not belong to a same serving cell, it is judged to perform the first channel sensing.

In one embodiment, the first receiver 1202 also receives a first signaling group, which is used to indicate a first time-frequency resource pool; wherein only when the first time-frequency resource group overlaps with the first time-frequency resource pool, the judging action of whether to perform the first channel sensing is performed.

In one embodiment, the first node further comprises:

a first transmitter 1203, transmitting a second signaling group, which is used to indicate a second time-frequency resource pool;

wherein only when the first time-frequency resource group overlaps with the second time-frequency resource pool, the judging action of whether to perform the first channel sensing is performed.

In one embodiment, the first receiver 1202 also receives a second radio signal; wherein the second information is used to indicate time-frequency resources occupied by the second radio signal, which the first radio signal is related to.

In one embodiment, the first channel sensing is performed in the reference time-frequency resource group, frequency-domain resources occupied by the reference time-frequency resource group are related to frequency-domain resources occupied by the first time-frequency resource group, the first channel sensing is used to obtain a first measurement value, and the size relationship between the first measurement value and a target threshold is used to determine whether to transmit the first radio signal in the first time frequency resource group.

In one embodiment, the first receiver 1202 also receives third information; wherein the third information is used to indicate the target threshold.

Embodiment 12

Figure 12:
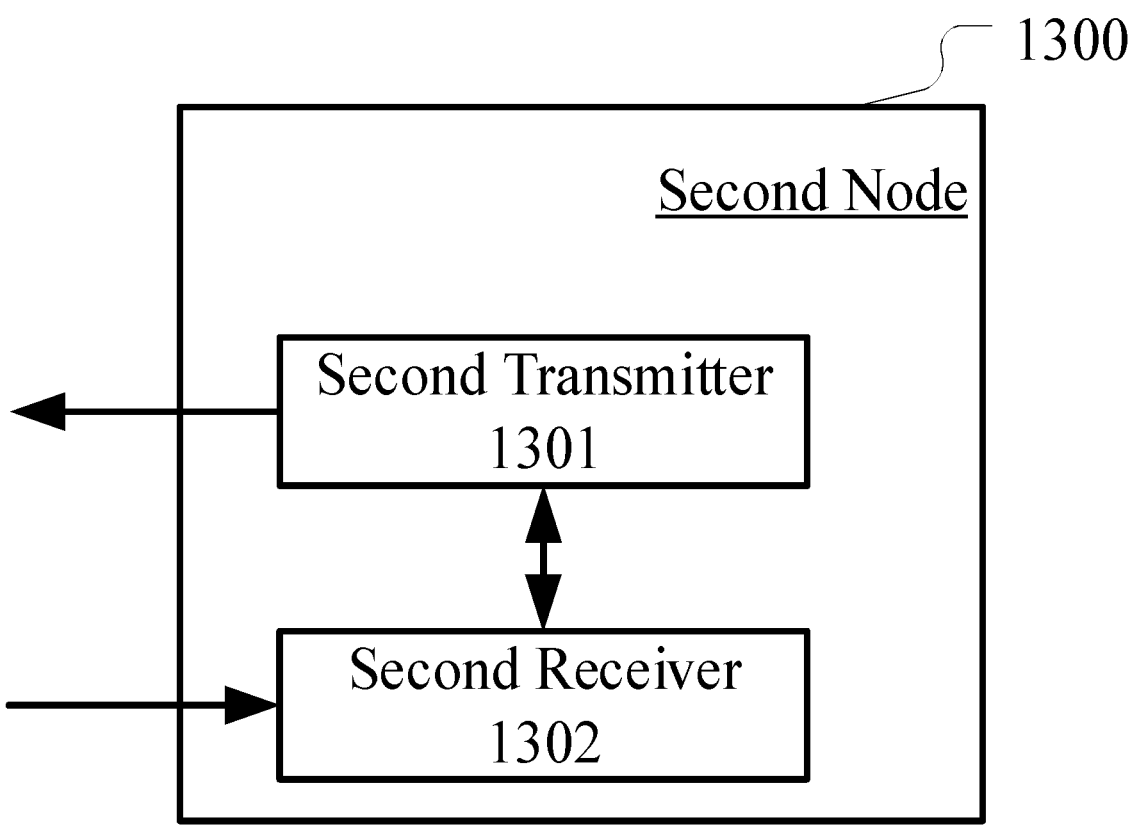
FIG. 12 illustrates a structure block diagram of a processing device in second node according to one embodiment of the present disclosure.

Embodiment 12 illustrates a structural block diagram of a processing device in a second node, as shown in FIG. 12. In FIG. 12, a second node processing device 1300 comprises a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second node 1300 is a UE supporting V2X communications.

In one embodiment, the second node 1300 is a base station supporting V2X communications.

In one embodiment, the second node 1300 is a relay node supporting V2X communications.

In one embodiment, the second transmitter 1301 comprises at least one of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first five of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first four of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first three of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first two of an antenna 420, a transmitter 418, a multi-antenna transmitting processor 471, a transmitting processor 416, a controller/processor 475 or a memory 476 in FIG. 4 of the present disclosure.

In one embodiment, the second receiver 1302 comprises at least one of an antenna 420, a receiver 418, a multi-antenna receiving processor 472, a receiving processor 470, a controller/processor 475 or a memory 476 in FIG. 4 of the present disclosure.

In one embodiment, the second receiver 1302 comprises at least the first five of an antenna 420, a receiver 418, a multi-antenna receiving processor 472, a receiving processor 470, a controller/processor 475 or a memory 476 in FIG. 4 of the present disclosure.

In one embodiment, the second receiver 1302 comprises at least the first four of an antenna 420, a receiver 418, a multi-antenna receiving processor 472, a receiving processor 470, a controller/processor 475 or a memory 476 in FIG. 4 of the present disclosure.

In one embodiment, the second receiver 1302 comprises at least the first three of an antenna 420, a receiver 418, a multi-antenna receiving processor 472, a receiving processor 470, a controller/processor 475 or a memory 476 in FIG. 4 of the present disclosure.

In one embodiment, the second receiver 1302 comprises at least the first two of an antenna 420, a receiver 418, a multi-antenna receiving processor 472, a receiving processor 470, a controller/processor 475 or a memory 476 in FIG. 4 of the present disclosure.

A second transmitter 1301 transmits first information and second information, the second information being used to determine a first time-frequency resource group;

a second receiver 1302 monitors a first radio signal in the first time-frequency resource group.

In Embodiment 15, the first information is used to determine whether transmitters of the second node and the second information belong to a same serving cell; the first information is used to judge whether the target receiver of the second information performs a first channel sensing; when the result of the judging action is no, the first radio signal is transmitted in the first time-frequency resource group; when the result of the judging action is yes, the first channel sensing is used to determine whether the first radio signal is transmitted in the first time-frequency resource group.

In one embodiment, when the second node and a target receiver of the second information belong to a same serving cell, the target receiver of the second information judges that the first channel sensing is not performed; when the second node and the target receiver of the second information do not belong to a same serving cell, the target receiver of the second information judges that the first channel sensing is performed.

In one embodiment, the second receiver 1302 also receives a second signaling group, which is used to indicate a second time-frequency resource pool; wherein only when the first time-frequency resource group overlaps with the second time-frequency resource pool, the action of monitoring the first radio signal in the first time-frequency resource group is performed.

In one embodiment, the second transmitter 1301 also transmits a second radio signal; wherein the second information is used to indicate time-frequency resources occupied by the second radio signal, and the first radio signal is related to the second radio signal.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules, and the present disclosure is not limited to combination of any specific form of software and hardware. A first node in the present disclosure comprises but is not limited to mobile phones, tablet computers, laptops, network cards, low-power equipment, eMTC device, NB-IoT device, vehicular communication device, aerobat, aircraft, UAV, remote-control aircraft and other wireless communication devices. A second node in the present disclosure comprises but is not limited to mobile phones, tablet computers, laptops, network cards, low-power device, eMTC device, NB-IOT device, vehicular communication device, aerobat, aircraft, UAV, remote control aircraft and other wireless communication devices. A user equipment or UE or a terminal in the present disclosure comprises but is not limited to mobile phones, tablet computers, laptops, network cards, low-power device, eMTC device, NB-IOT device, vehicular communication device, aerobat, aircraft, UAV, remote control aircraft and other wireless communication devices. A base station or network-side device in the present disclosure comprises but is not limited to the macro-cellular base station, micro-cellular base station, home base station, relay base station, eNB, gNB, transmitting and receiving node TRP, GNSS, relay satellite, satellite base station, air base station and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node used for wireless communication, comprising: a first receiver, receiving first information and second information, the second information being used to determine a first time-frequency resource group; and a first transceiver, judging whether to perform a first channel sensing; when a result of the judging action is no, transmitting a first radio signal in the first time-frequency resource group; when the result of the judging action is yes, performing the first channel sensing to determine whether to transmit the first radio signal in the first time-frequency resource group; when the result of the determining action is yes, transmitting the first radio signal in the first time-frequency resource group; when the result of the determining action is no, dropping transmission of the first radio signal in the first time-frequency resource group; wherein the first channel sensing is performed in a reference time-frequency resource group, frequency-domain resources occupied by the reference time-frequency resource group are related to frequency-domain resources occupied by the first time-frequency resource group; the first channel sensing is used to obtain a first measurement value, and size relationship between the first measurement value and a target threshold is used to determine whether to transmit the first radio signal in the first time-frequency resource group; when the first measurement value is greater than the target threshold, the transmission of the first radio signal is dropped in the first time-frequency resource group; when the first measurement value is less than the target threshold, the first radio signal is transmitted in the first time-frequency resource group; the first measurement value comprises Reference Signal Received Power (RSRP), or, the first measurement value comprises Reference Signal Received Quality (RSRQ), or, the first measurement value comprises a Received Signal Strength Indicator (RSSI); the first information is used to determine whether the first node and a transmitter of the second information belong to a same serving cell, and the first information is used to judge whether to perform the first channel sensing; the first radio signal comprises a transport block, or the first radio signal carries CSI, or the first radio signal carries a HARQ; the transmitter of the second information is a UE.

2. The first node according to claim 1, wherein when the first node and the transmitter of the second information belong to a same serving cell, it is judged not to perform the first channel sensing; when the first node and the transmitter of the second information do not belong to a same serving cell, it is judged to perform the first channel sensing.

3. The first node according to claim 1, wherein: the first receiver also receives a first signaling group, and the first signaling group is used to indicate a first time-frequency resource pool; wherein only when the first time-frequency resource group overlaps with the first time-frequency resource pool, the action of judging whether to perform the first channel sensing is performed; or, the first node further comprises a first transmitter transmitting a second signaling group, wherein the second signaling group is used to indicate a second time-frequency resource pool, and only when the first time-frequency resource group overlaps with the second time-frequency resource pool, the action of judging whether to perform the first channel sensing is performed.

4. The first node according to claim 1, wherein the first receiver also receives a second radio signal; wherein the second information is used to indicate time-frequency resources occupied by the second radio signal, and the first radio signal is related to the second radio signal; the first radio signal carries CSI based on a measurement of the second radio signal, or, the first radio signal is used to indicate whether the second radio signal is correctly decoded.

5. The first node according to claim 1, wherein the first receiver also receives third information; wherein the third information is used to indicate the target threshold.

6. A second node for wireless communication, comprising: a second transmitter, transmitting first information and second information, the second information being used to determine a first time-frequency resource group; and a second receiver, monitoring a first radio signal in the first time-frequency resource group; wherein the first information is used to determine whether the second node and a target receiver of the second information belong to a same serving cell; the first information is used to judge whether the target receiver of the second information performs a first channel sensing; when a result of the judging action is no, the first radio signal is transmitted in the first time-frequency resource group; when the result of the judging action is yes, the first channel sensing is used to determine whether the first radio signal is transmitted in the first time-frequency resource group; the first radio signal comprises a transport block, or the first radio signal carries CSI, or the first radio signal carries a HARQ; and the second node is a UE; the first channel sensing is performed in a reference time-frequency resource group, frequency-domain resources occupied by the reference time-frequency resource group are related to frequency-domain resources occupied by the first time-frequency resource group; the first channel sensing is used to obtain a first measurement value, and size relationship between the first measurement value and a target threshold is used to determine whether to transmit the first radio signal in the first time-frequency resource group; when the first measurement value is greater than the target threshold, the transmission of the first radio signal is dropped in the first time-frequency resource group; when the first measurement value is less than the target threshold, the first radio signal is transmitted in the first time-frequency resource group; the first measurement value comprises Reference Signal Received Power (RSRP), or, the first measurement value comprises Reference Signal Received Quality (RSRQ), or, the first measurement value comprises a Received Signal Strength Indicator (RSSI).

7. The second node according to claim 6, wherein when the second node and the target receiver of the second information belong to a same serving cell, the target receiver of the second information judges not to perform the first channel sensing; when the second node and the target receiver of the second information do not belong to a same serving cell, the target receiver of the second information judges to perform the first channel sensing.

8. The second node according to claim 6, wherein the second receiver also receives a second signaling group, the second signaling group being used to indicate a second time-frequency resource pool; wherein only when the first time-frequency resource group overlaps with the second time-frequency resource pool, the action of monitoring the first radio signal in the first time-frequency resource group is performed.

9. The second node according to claim 6, wherein the second transmitter also transmits a second radio signal; herein, the second information is used to indicate time-frequency resources occupied by the second radio signal, and the first radio signal is related to the second radio signal; the first radio signal carries CSI based on a measurement of the second radio signal, or, the first radio signal is used to indicate whether the second radio signal is correctly decoded.

10. A method used in a first node for wireless communication, comprising: receiving first information and second information, the second information being used to determine a first time-frequency resource group; and judging whether to perform a first channel sensing; when a result of the judging action is no, transmitting a first radio signal in the first time-frequency resource group, and when the result of the judging action is yes, performing the first channel sensing to determine whether to transmit the first radio signal in the first time-frequency resource group; when the result of the determining action is yes, transmitting the first radio signal in the first time-frequency resource group, when the result of the determining action is no, dropping transmission of the first radio signal in the first time-frequency resource group; wherein the first channel sensing is performed in a reference time-frequency resource group, and frequency-domain resources occupied by the reference time-frequency resource group are related to frequency-domain resources occupied by the first time-frequency resource group; the first channel sensing is used to obtain a first measurement value, and size relationship between the first measurement value and a target threshold is used to determine whether to transmit the first radio signal in the first time-frequency resource group; when the first measurement value is greater than the target threshold, the transmission of the first radio signal is dropped in the first time-frequency resource group; when the first measurement value is less than the target threshold, the first radio signal is transmitted in the first time-frequency resource group; the first measurement value comprises Reference Signal Received Power (RSRP), or, the first measurement value comprises Reference Signal Received Quality (RSRQ), or, the first measurement value comprises a Received Signal Strength Indicator (RSSI); the first information is used to determine whether the first node and a transmitter of the second information belong to a same serving cell, and the first information is used to judge whether to perform the first channel sensing; the first radio signal comprises a transport block, or the first radio signal carries CSI, or the first radio signal carries a HARQ; the transmitter of the second information is a UE.

11. The method according to claim 10, wherein when the first node and the transmitter of the second information belong to a same serving cell, it is judged not to perform the first channel sensing; when the first node and the transmitter of the second information do not belong to a same serving cell, it is judged to perform the first channel sensing.

12. The method according to claim 10, comprising: receiving a first signaling group, and the first signaling group is used to indicate a first time-frequency resource pool; wherein only when the first time-frequency resource group overlaps with the first time-frequency resource pool, the action of judging whether to perform the first channel sensing is performed; or, transmitting a second signaling group, the second signaling group is used to indicate a second time-frequency resource pool; wherein only when the first time-frequency resource group overlaps with the second time-frequency resource pool, the action of judging whether to perform the first channel sensing is performed.

13. The method according to claim 10, comprising: receiving a second radio signal; wherein the second information is used to indicate time-frequency resources occupied by the second radio signal, and the first radio signal is related to the second radio signal; the first radio signal carries CSI based on a measurement of the second radio signal, or, the first radio signal is used to indicate whether the second radio signal is correctly decoded.

14. The method according to claim 10, comprising: receiving third information; wherein the third information is used to indicate the target threshold.

15. A method used in a second node for wireless communication, comprising: transmitting first information and second information, the second information being used to determine a first time-frequency resource group; monitoring a first radio signal in the first time-frequency resource group; wherein the first information is used to determine whether the second node and a target receiver of the second information belong to a same serving cell; the first information is used to judge whether the target receiver of the second information performs a first channel sensing; when a result of the judging action is no, the first radio signal is transmitted in the first time-frequency resource group; when the result of the judging action is yes, the first channel sensing is used to determine whether the first radio signal is transmitted in the first time-frequency resource group; the first radio signal comprises a transport block, or the first radio signal carries CSI, or the first radio signal carries a HARQ; and the second node is a UE; the first channel sensing is performed in a reference time-frequency resource group, frequency-domain resources occupied by the reference time-frequency resource group are related to frequency-domain resources occupied by the first time-frequency resource group; the first channel sensing is used to obtain a first measurement value, and size relationship between the first measurement value and a target threshold is used to determine whether to transmit the first radio signal in the first time-frequency resource group; when the first measurement value is greater than the target threshold, the transmission of the first radio signal is dropped in the first time-frequency resource group; when the first measurement value is less than the target threshold, the first radio signal is transmitted in the first time-frequency resource group; the first measurement value comprises Reference Signal Received Power (RSRP), or, the first measurement value comprises Reference Signal Received Quality (RSRQ), or, the first measurement value comprises a Received Signal Strength Indicator (RSSI).

16. The method according to claim 15, wherein when the second node and the target receiver of the second information belong to a same serving cell, the target receiver of the second information judges not to perform the first channel sensing; when the second node and the target receiver of the second information do not belong to a same serving cell, the target receiver of the second information judges to perform the first channel sensing.

17. The method according to claim 15, comprising: receiving a second signaling group, the second signaling group is used to indicate a second time-frequency resource pool; wherein only when the first time-frequency resource group overlaps with the second time-frequency resource pool, the action of monitoring the first radio signal in the first time-frequency resource group is performed.

18. The method according to claim 15, comprising: transmitting a second radio signal; wherein the second information is used to indicate time-frequency resources occupied by the second radio signal, and the first radio signal is related to the second radio signal; the first radio signal carries CSI based on a measurement of the second radio signal, or, the first radio signal is used to indicate whether the second radio signal is correctly decoded.

* * * * *